(12) United States Patent
Kearfott

(10) Patent No.: US 7,855,375 B2
(45) Date of Patent: Dec. 21, 2010

(54) INTEGRATIVE AND REAL-TIME RADIATION MEASUREMENT METHODS AND SYSTEMS

(75) Inventor: Kimberlee Jane Kearfott, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 12/341,102

(22) Filed: Dec. 22, 2008

(65) Prior Publication Data

US 2009/0101825 A1 Apr. 23, 2009

Related U.S. Application Data

(63) Continuation of application No. 11/440,974, filed on May 25, 2006, now Pat. No. 7,485,877.

(60) Provisional application No. 60/685,740, filed on May 27, 2005.

(51) Int. Cl.
 *G01T 1/11* (2006.01)
(52) U.S. Cl. .................................................. 250/484.3
(58) Field of Classification Search .............. 250/484.2, 250/458.1, 472.1, 483.1, 484.3, 484.4, 484.5, 250/482.1, 486.1
See application file for complete search history.

(56) References Cited

U.S. PATENT DOCUMENTS

| | | | | |
|---|---|---|---|---|
| 3,484,605 A * | 12/1969 | Attix | ......................... | 250/337 |
| 4,465,936 A * | 8/1984 | Ishiguro et al. | .......... | 250/484.3 |
| 4,825,084 A * | 4/1989 | Braunlich et al. | ........ | 250/484.3 |
| 4,975,589 A * | 12/1990 | Chamberlain et al. | .... | 250/484.3 |
| 5,081,362 A * | 1/1992 | Vargo | ...................... | 250/472.1 |
| 5,083,031 A * | 1/1992 | Hoelsher et al. | ......... | 250/484.3 |
| 6,198,108 B1 * | 3/2001 | Schweitzer et al. | ...... | 250/472.1 |

* cited by examiner

*Primary Examiner*—David P Porta
*Assistant Examiner*—Marcus H Taningco
(74) *Attorney, Agent, or Firm*—Harness, Dickey & Pierce, P.L.C.

(57) ABSTRACT

A method of determining the radiation type and energy distribution of a radiation source that outputs radiation. The method including providing a plurality of detector materials and exposing the plurality of detector materials to the radiation. Each of the plurality of detector materials stores a signal in response to being exposed to the radiation. The signals are representative of the radiation. The plurality of detector materials is stimulated to output the signals as measured signals. These measured signals are used to determine the radiation type and energy distribution of the radiation.

15 Claims, 15 Drawing Sheets

INTEGRATIVE AND REAL-TIME RADIATION MEASUREMENT METHODS AND SYSTEMS

CROSS-REFERENCE TO RELATED APPLICATIONS

This application is a continuation of U.S. patent application Ser. No. 11/440,974 filed on May 25, 2006, which claims the benefit of U.S. Provisional Application No. 60/685,740, filed on May 27, 2005. The disclosure of the above applications is incorporated herein by reference.

FIELD

The present disclosure relates to methods and systems for the detection of ionizing (nuclear) radiation, identification of the isotopic, and other sources of such radiation, and determination of the time when such radiation was observed. More particularly, the present disclosure relates to methods and systems for preparation of systems employing dosimetric materials and methods of analysis of the data they collect to determine both the nature and extent of radiation to which they were exposed and the temporal information allowing determination of the duration and time of exposure.

BACKGROUND AND SUMMARY

The statements in this section merely provide background information related to the present disclosure and may not constitute prior art.

A national security threat is posed from illicit radioactive materials being released into a populated area using radiological dispersive devices (RDD) or "dirty bombs". Many of these dispersive devices employ conventional explosives as their primary propellant.

Consequently, it is desirable to intercept these devices prior to a planned detonation or release. Often times, interception can be achieved through the detection of radioactive substances that are typically associated with such devices, even when such radioactive substances are concealed in containers, such as shipping containers, vehicles, luggage, parcels and the like.

In some cases, it is desirable to quickly evaluate an area that has been exposed to a release of radioactive material. For example, it can be useful to determine the geographical extent of the contamination and whether additional spreading has occurred or may occur. Information garnered from such detection and/or evaluation may prove valuable in assessing the initial risks, quelling fear or panic, and/or permitting timely evacuation of an area, closure of building ventilation systems, sheltering, or other actions directed to lessen the effects of the event. Still further, during cleanup, it can also be useful to continuously reassess the distribution of radioactivity, which may vary in response to local circumstances, such as weather conditions.

Energized portable radiation-producing equipment, such as battery-powered x-ray tubes, can also be hidden in vehicles and used to significantly expose the public as they drive by or sit in a strategic location. Detection of such events while they are occurring would be useful in preventing the exposure of large number of individuals and in capturing the perpetrators. Detection of the path of such vehicles following this type of terrorist event is invaluable for estimating doses delivered to individuals so that they may be appropriately advised and managed medically, as well as for the purposes of garnering information that can be useful for bringing the terrorists to justice.

The illegal movement of special nuclear materials (SNM) needed to make nuclear weapons, such as uranium and plutonium, remains an unsolved detection problem. Similar in nature to the radiological dispersive device (RDD) problem, early detection can prevent undesirable events and assist in the identification of terrorists. Nuclear weapons use would also result in the widespread dispersion of radioactive materials, and the attendant radiation detection problems associated with it.

Widespread networks of radiation detection devices in cities, agricultural districts, strategic areas, along international borders (within the U.S. and around states from which illicit nuclear materials may be anticipated to be leaving), and around nuclear power and nuclear weapons facilities are highly desirable.

Additional needs for active radiation detection, monitoring and reporting arise within, at the boundaries of, and in the communities surrounding nuclear power, nuclear weapon, and other facilities that utilize radioactive materials both during real-time operation (for monitoring routine releases) and to be present in the event of accidents. Radioactive waste storage and disposal facilities would also benefit from such continuous radiation monitoring. A greater understanding of the dynamics or movements of radionuclides in the environment after release can also be gleaned from information obtained during routine releases as well as for accidents. Such information would be useful for future preparedness planning.

The provision of passive dosimeters from which temporal information may later be derived would also be of great benefit in the area of personnel dosimetry. Because of increasing concerns about tactical nuclear weapons and usage of radiological dispersive devices (RDD) that target troops, inexpensive dosimeters for military personnel who are not usually considered radiation workers are also needed.

While comprehensive screening of cargo and deployment of large radiation detection networks are highly desirable, affordable technology capable of economically performing this function is not yet available. A comprehensive network of radiation detection devices would intercept and monitor the movement of radioactive materials; however affordable technology is not yet available.

The teachings of the present disclosure can also be used for intelligence gathering and other forensic purposes for which it is desirable to determine when or if a given individual or specific item has been exposed to radiation. Retrospective information about the movement of radioactive materials in the environment can, for example, help track a terrorist who set off a dirty bomb or used a portable radiation-producing device to expose a population.

The teachings of the present disclosure may provide utility in connection with the above problems and may also be useful when applied to problems relating to dating geological, archeological, and other samples. Corrections can also be made for retrospective dosimetry using the teachings set forth herein.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 7:
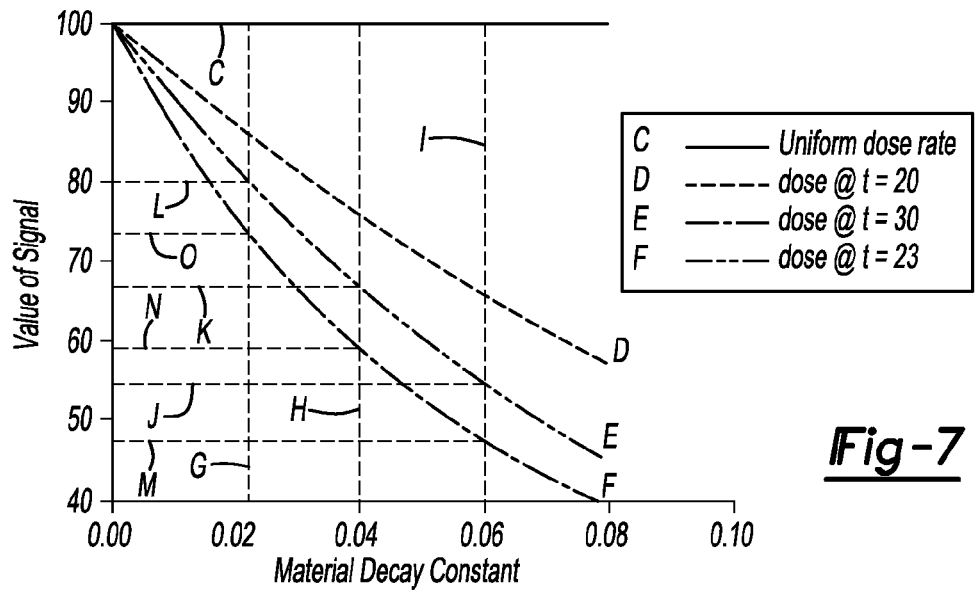
Figure 8A:
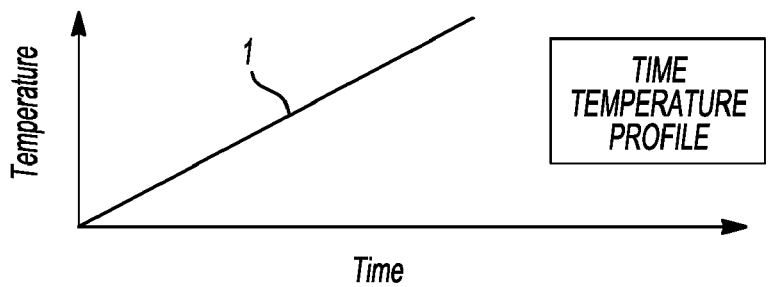
Figure 8B:
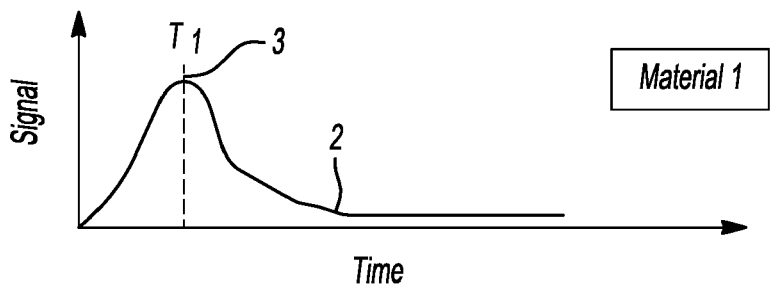
Figure 8C:
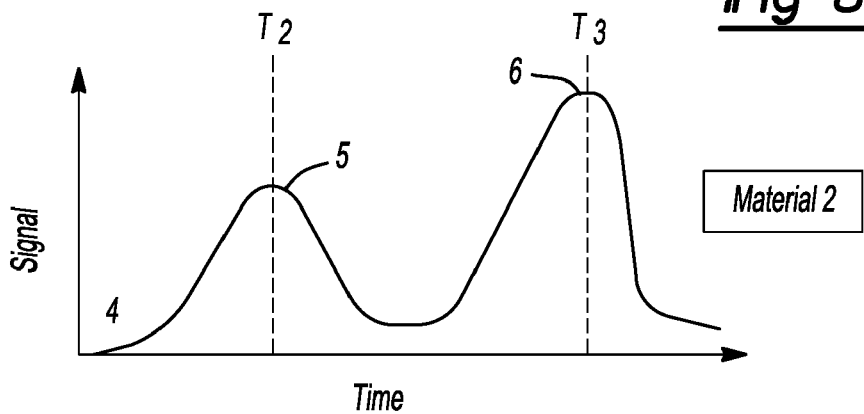
Figure 8D:
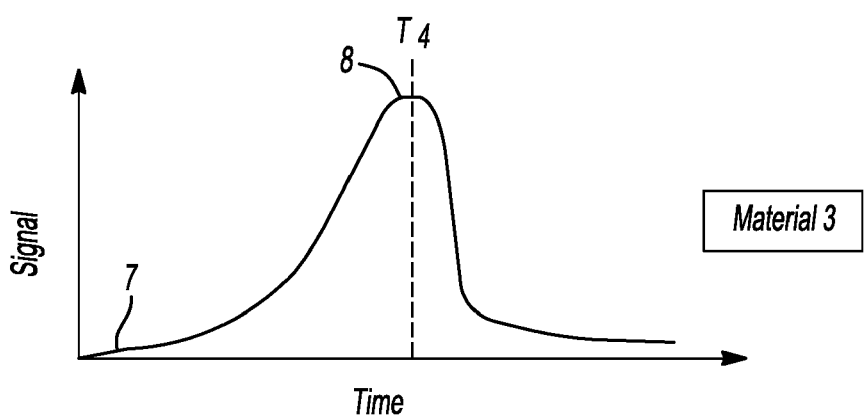
Figure 9A:
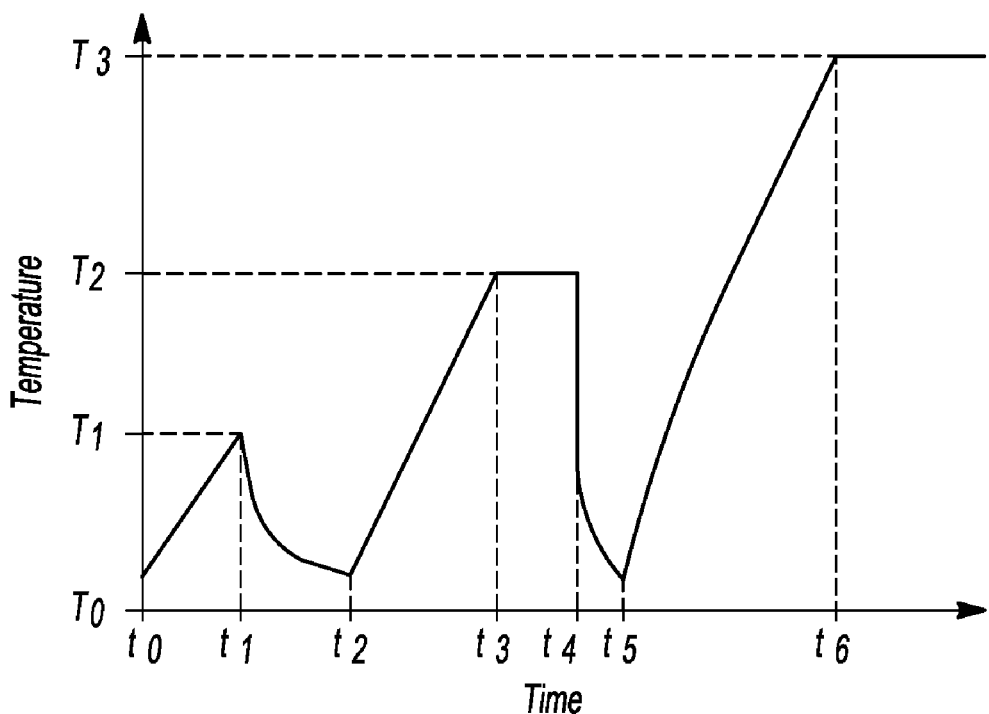
Figure 9B:
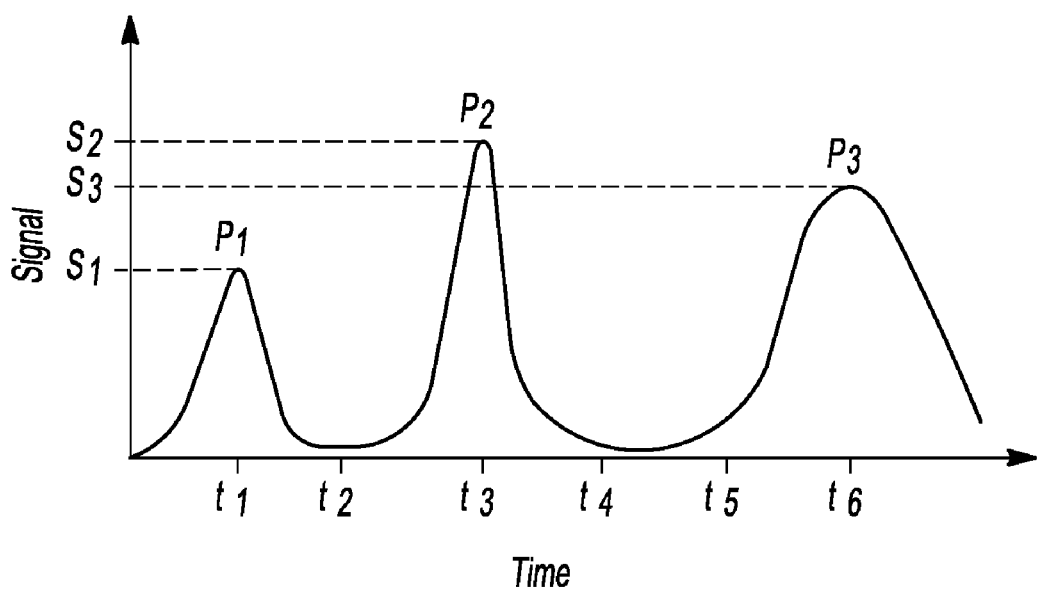
Figure 10A:
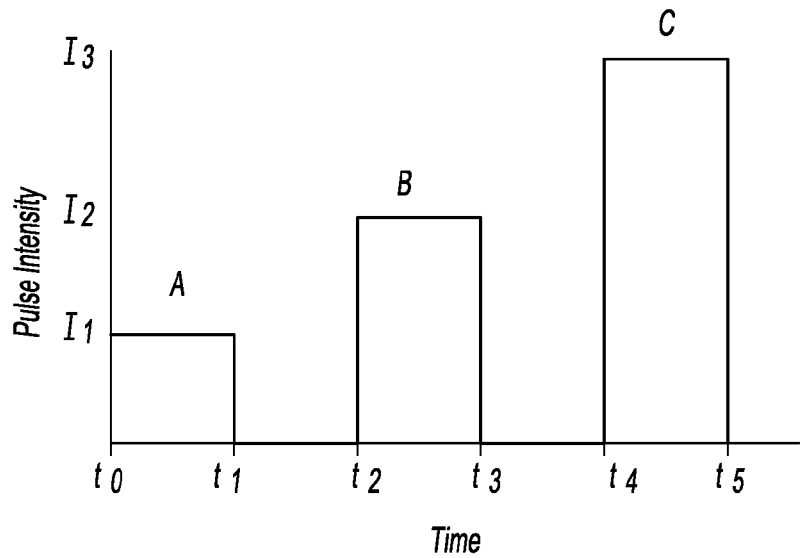
Figure 10B:
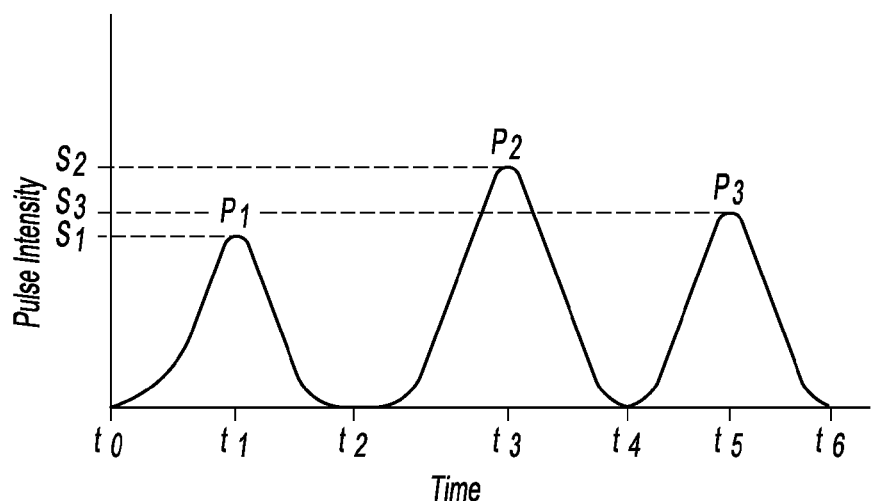
Figure 11:
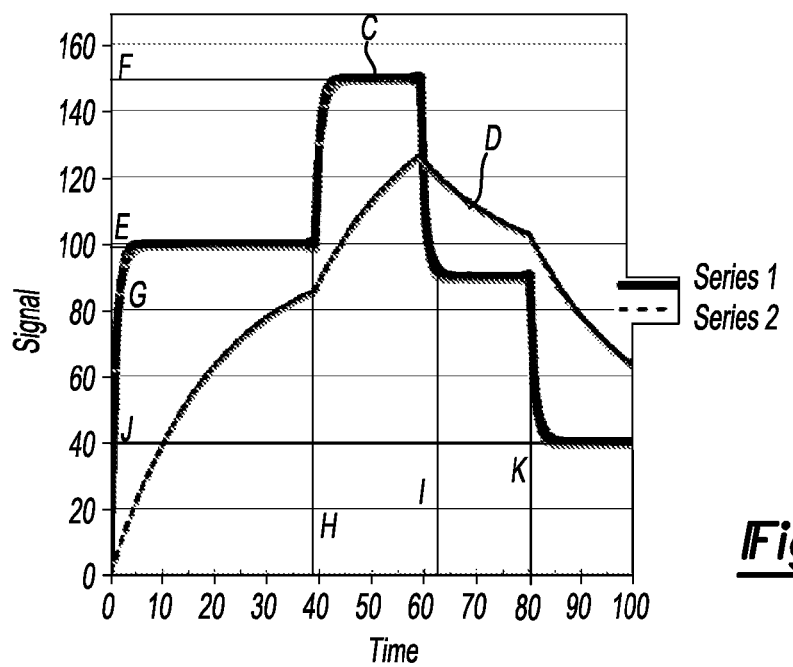
Figure 12:
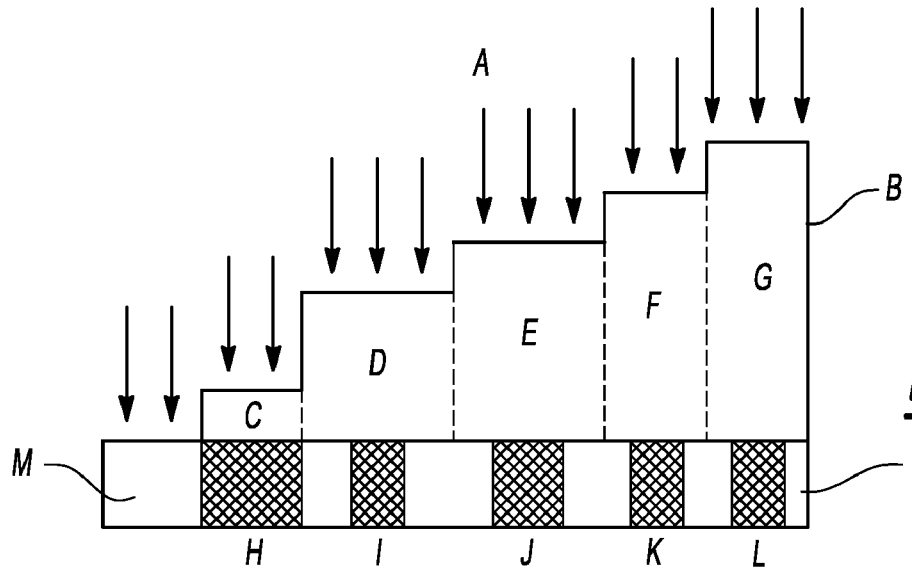
Figure 15:
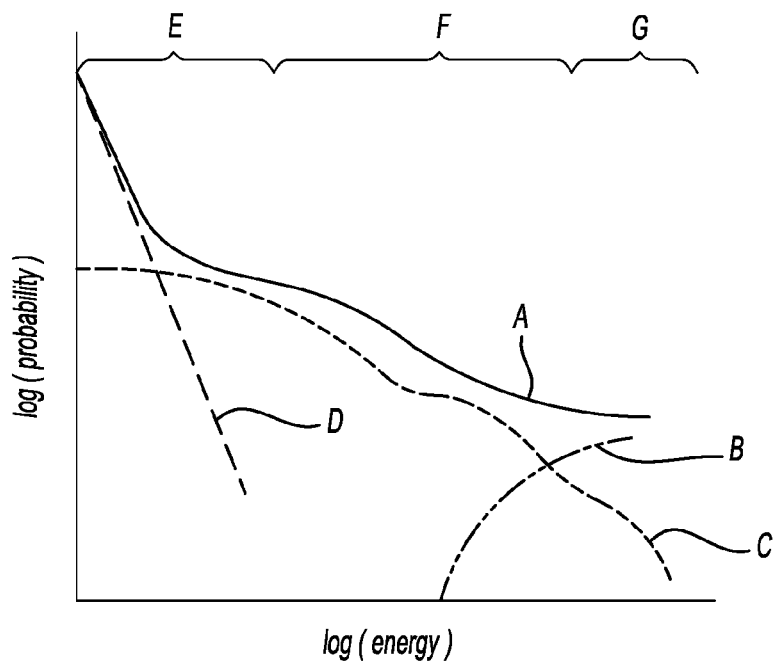
Figure 16:
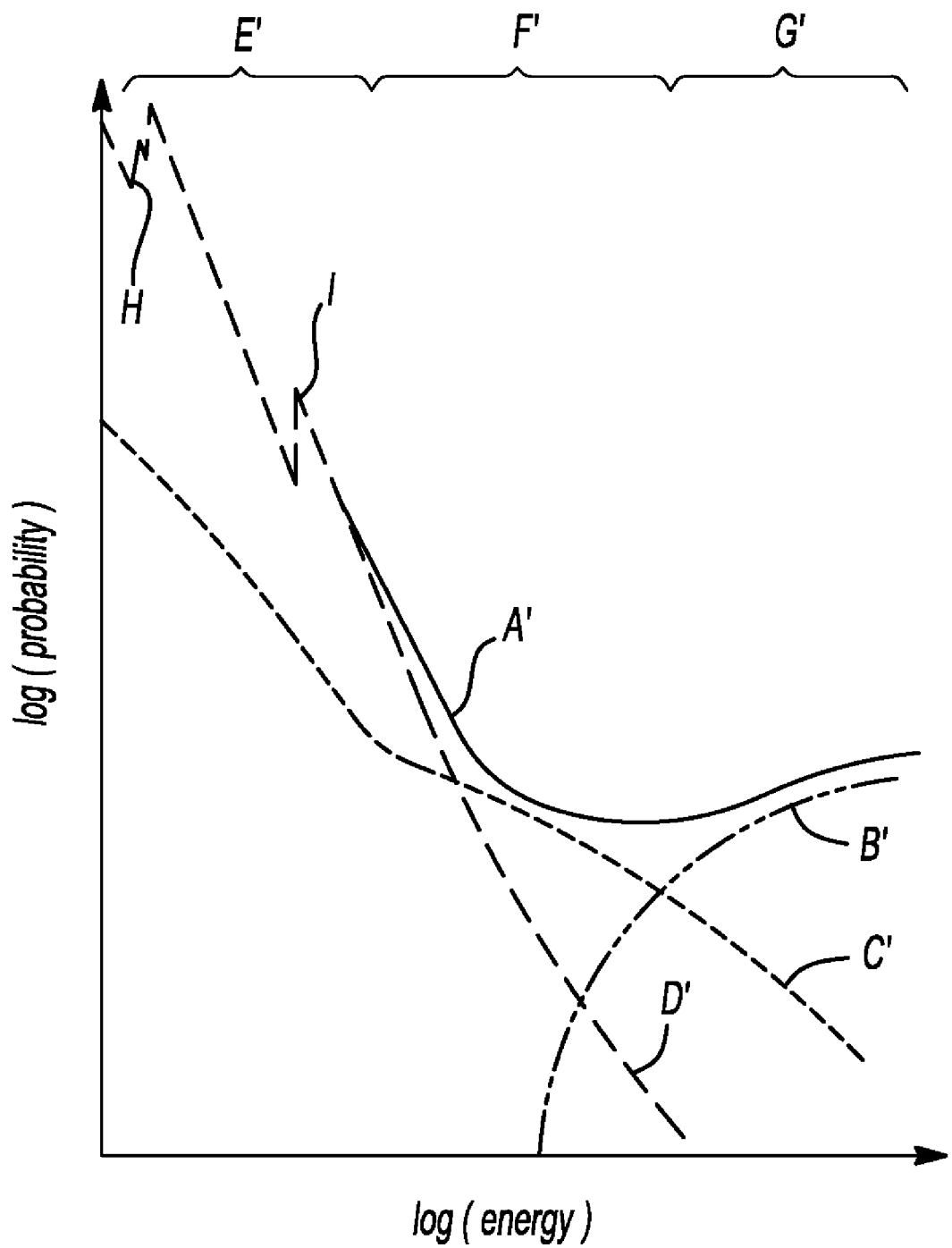
Figure 17A:
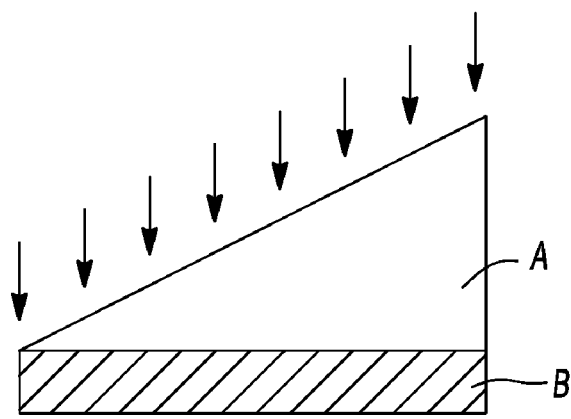
Figure 17B:
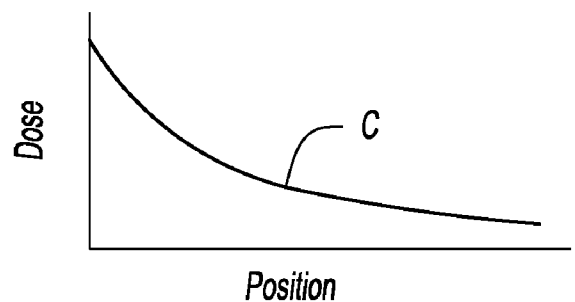
Figure 17C:
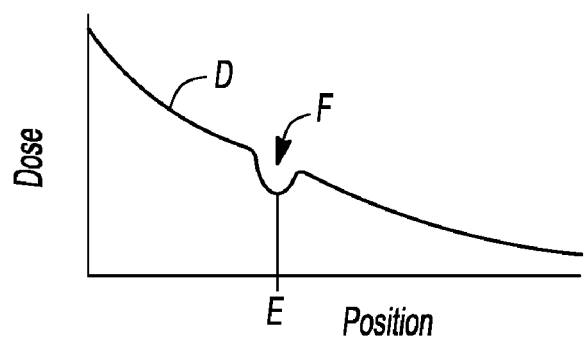
Figure 17D:
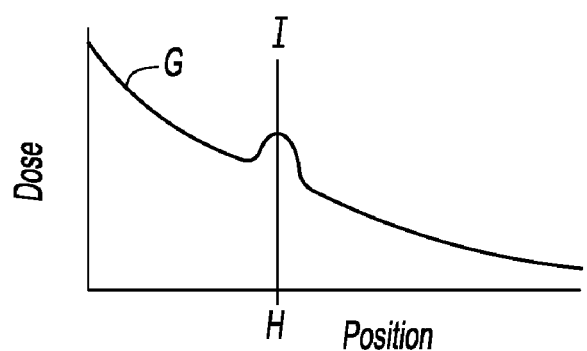
Figure 18:
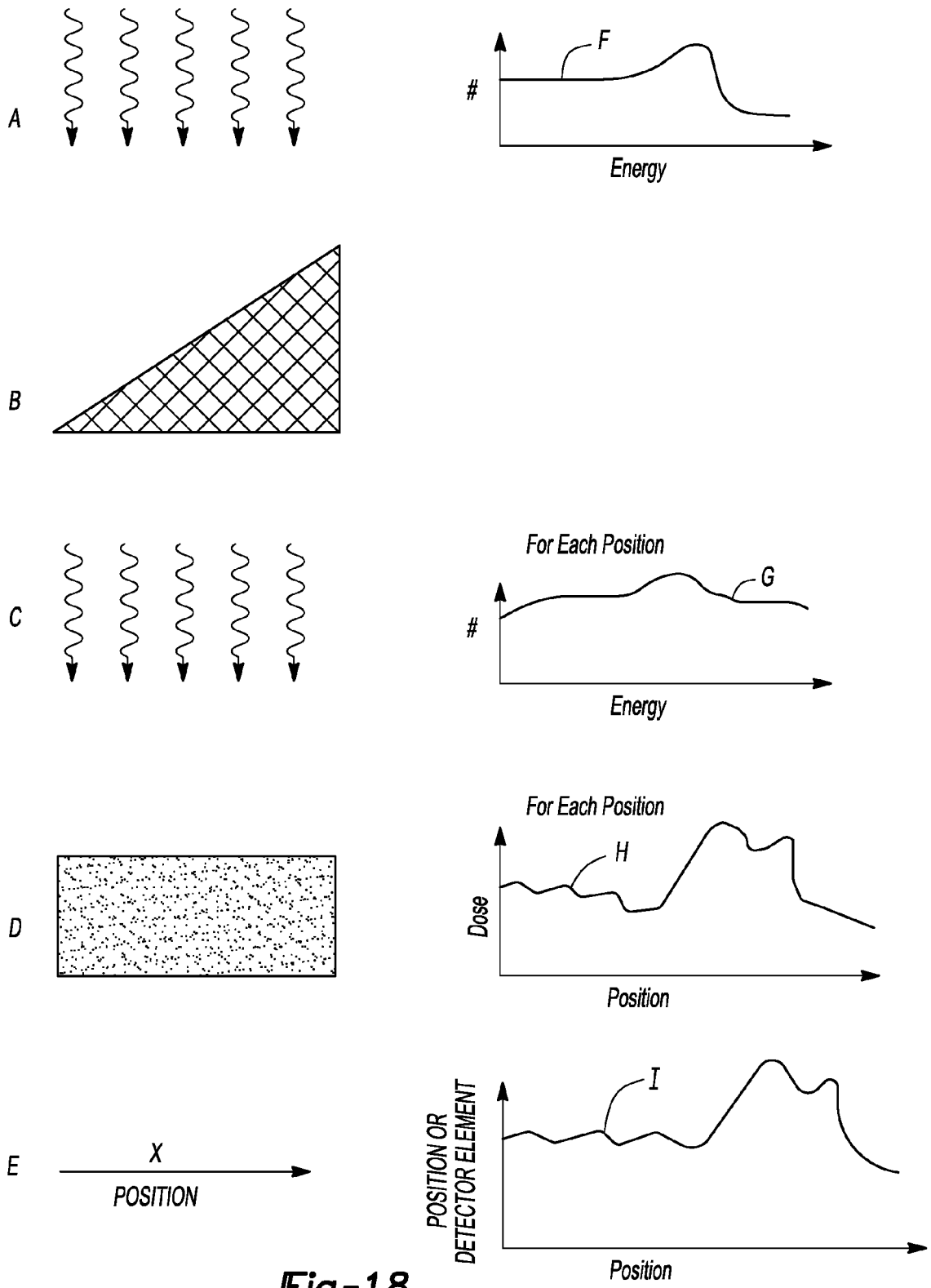
Figure 19:
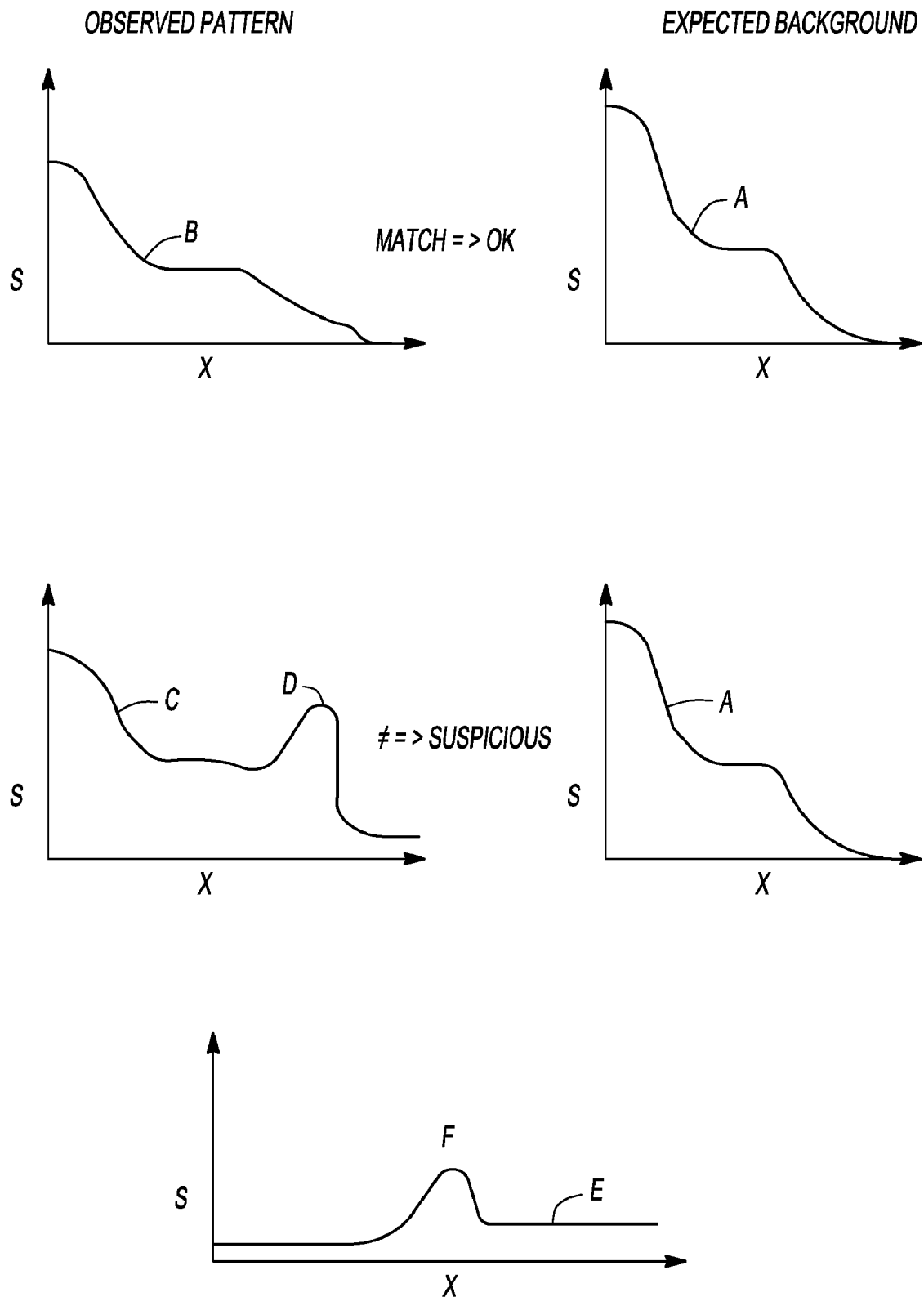
Figure 20:
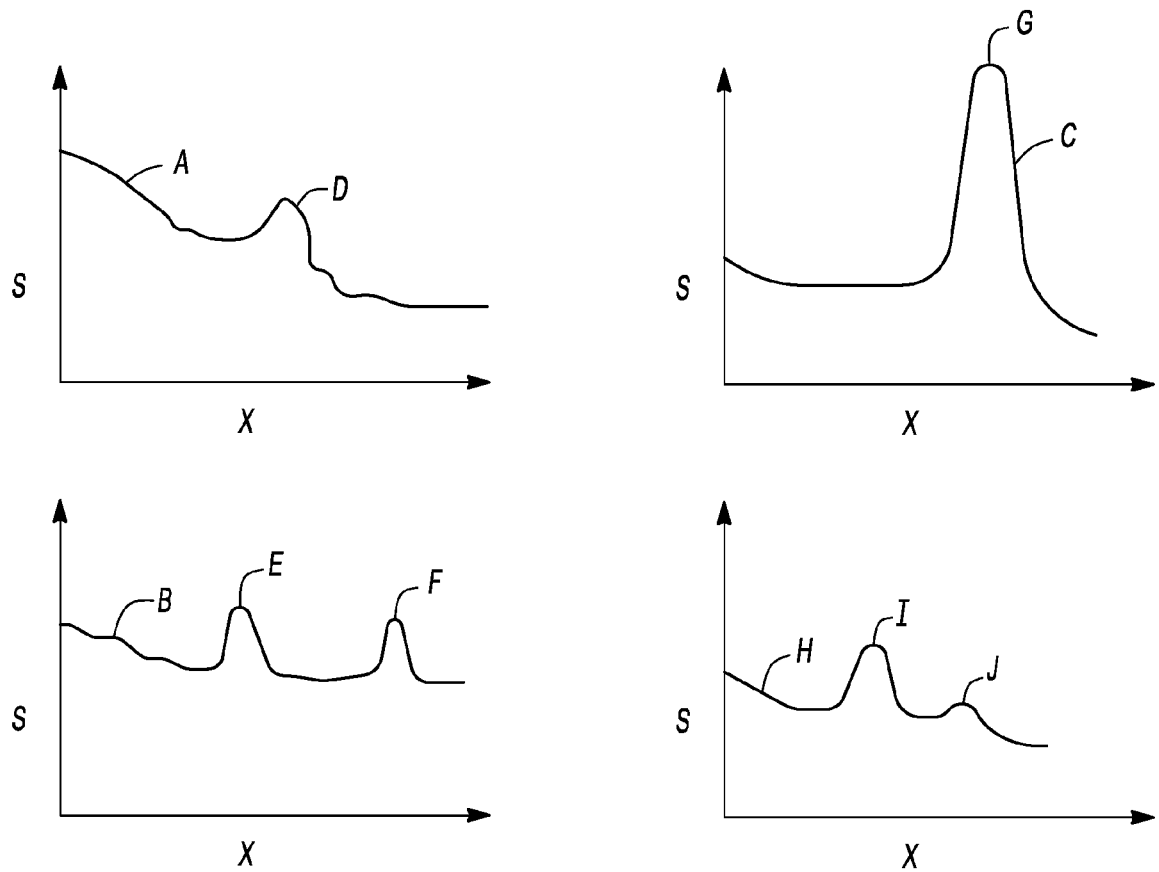
Figure 21:
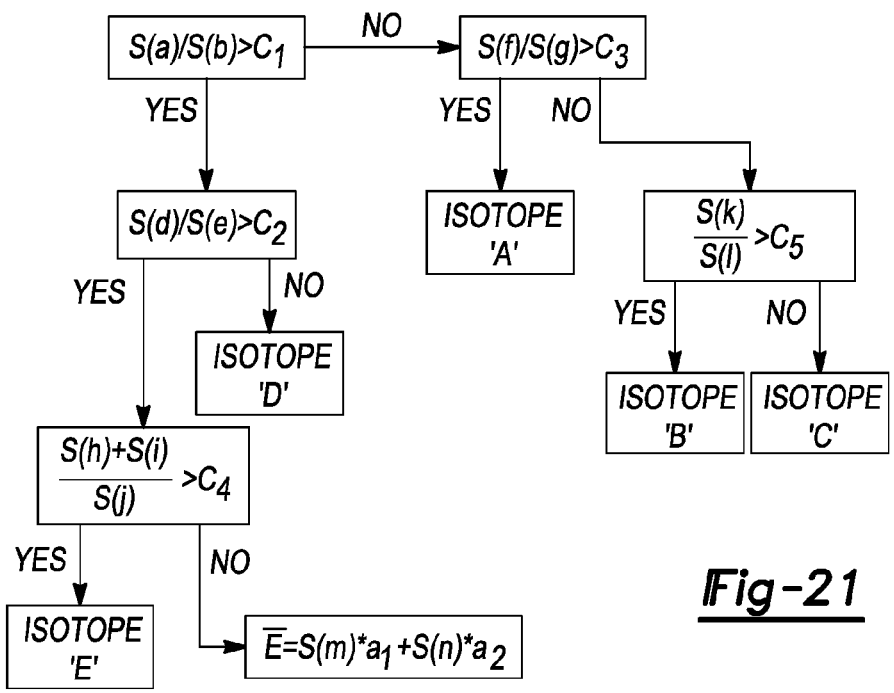
Figure 22:
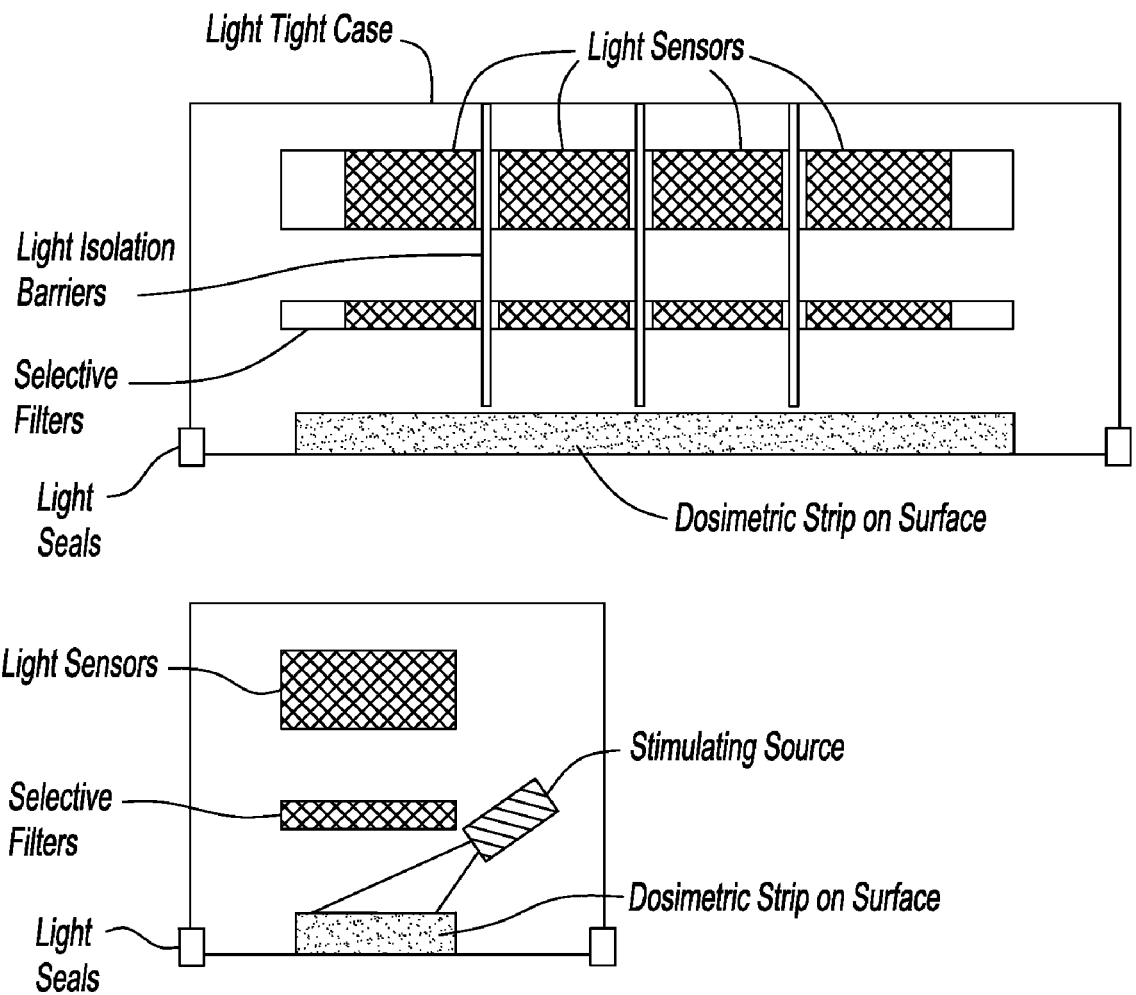

FIG. 7 is a graph illustrating the response of a fading dosimeter system for different times of delivery of a pulsed dose, with dose times and material decay constants expressed in arbitrary time and inverse time units (case shown is for several materials having signal fading rates that are significantly different and that include signal-fading rates that are relatively rapid compared with the time of interest);

FIGS. 8A-D are a series of graphs illustrating the glow curves for separate TLD or OSL materials, for which the glow curves do not need much computerized processing or other separation methods applied to them in order to accurately and precisely identify the individual peaks or quantify the individual peak areas;

FIGS. 9A-B illustrate an example modified heating method resulting in cleaner, separated TL peaks that do not required special processing to accurately and precisely identify the individual peaks or quantify the individual peak areas;

FIGS. 10A-B illustrate a pulsed heating scheme designed to selectively extract peaks from a TL material that having increasingly longer fading times, i.e. are of increasingly greater energy below the conduction band (if stimulating light pulses were made of increasingly shorter wavelengths, a similar scheme could be applied to OSL dosimeters);

FIG. 11 is a graph illustrating self-equilibration of integrating dosimeters having differing fading rates;

FIG. 12 is a graph illustrating an example step wedge filter used with multiple independent detectors for obtaining radiation type and energy information;

FIGS. 13A-D are a series of filter geometries, namely (A) simple step wedge, (B) step wedge made of two different materials, (C) combination of different materials and filter shapes, and (D) combination of different filter steps of differing materials;

FIGS. 14A-D are a series of schematic view illustrating a small selection of possibilities for detector modules that can be used for obtaining radiation type and energy information, namely (A) distinct detector elements, (G) detector elements with different thicknesses of detectors, (K) detector elements of different materials, and (N) a directionally sensitive detector element;

FIG. 15 is a schematic graph illustrating the probability of interaction of photons (gamma and x-rays) of different energies for different radiation interaction types in a light material (i.e. having low atomic number), such as water;

FIG. 16 is a schematic graph illustrating the probability of interaction of photons (gamma and x-rays) of different energies for different radiation interaction types in a heavy material (i.e. having high atomic number), such as lead;

FIGS. 17A-D are a series of graphs illustrating dose (related to signal) as a function of position in a continuous detector located behind a step wedge showing the effects of the presence of peaks in the interaction probability curves as a function of photon energy;

FIG. 18 illustrates energy spectra (number of photons or other radiation quanta as a function of energy) as a function of position along the axis of a step wedge filter as shown entering and leaving the filter, shown along with the resulting dose and signal as a function of position;

FIG. 19 illustrates a comparison of observed pattern of signal as a function of position in a continuous detector behind a filtration system with expected background patterns (a subtraction of background pattern from the observed pattern for a suspicious situation is included (this subtraction would be near zero with no distinct pattern for non-suspicious situations));

FIG. 20 illustrates observed signal patterns as a function of position at various locations along the axis of a filter in comparison with a library of signal patterns expected for known radiation sources;

FIG. 21 is a flowchart illustrating a schema for a branching algorithm used to identify the specific isotopes or radiation producing devices that result in an observed set of signals in a discrete or continuous detector module that has been filtered to extract spectroscopic information; and FIG. 22 is a schematic view of a suitable reader concept.

DETAILED DESCRIPTION

The following description is merely exemplary in nature and is not intended to limit the present disclosure, application, or uses.

Desirable Characteristics of Methods and Systems

One of the most important performance characteristics of a practical radiation detection system is its ability to detect small amounts of radiation, which is often associated with shielded devices. This capability is typically referred to as "sensitivity". The radiation detection sensitivity for traditional radiation detection systems is determined by the total number of "counts" for some systems or the instantaneous count rate for others. Thus the duration of time during which an object is examined is critical for being able to detect small amounts of radiation.

While extending observation times is possible in the laboratory environment, it is more difficult in a field environment where the background radiation may be high or changing, and the object may be large in size. Some detectors (for example portal monitors) require significant time to collect signal with needed sensitivity, resulting in inspection delays. Checking large objects individually at a port with current technology would result in delays of approximately 10 minutes, such that 100% inspection of cargo would be impractical. The use of real-time electronics-based radiation detection systems becomes impractical when it is necessary to screen large numbers of objects under the time constraints typically required to avoid disruption of transportation facilities operations. The expense associated with the available detection systems also precludes their widespread continuous deployment.

A further problem exists in that if a detection system is adequately sensitive, it may lack the ability to distinguish the type and energy of radiation (called "specificity"). This can lead to unacceptably high false alarm rate and alarms being triggered by benign sources such as medical implants, bananas, cat litter, naturally radioactive building materials, and other mildly radioactive items of commerce. The result has been an inability to monitor shipping containers, vehicles, luggage, parcels, objects, and environmental areas adequately because of the disruptions caused by benign materials.

Present Approaches to Radiation Detection and their Limitations

A variety of sizes (credit card, pocket, bread box, and billboard) of electronics-based radiation detection systems using different sensors and on-board electronics is available. These conventional detectors detect nuclear radiation in the forms of alphas, betas, and gamma rays using Geiger-Muller, ion chamber, or other gaseous counters; solid-state sensors, such as high-purity germanium or cadmium zinc telluride; plastic scintillators; liquid scintillators; and inorganic scintillators, such as bismuth germanate and sodium iodide.

Traditional electronics-based radiation detection systems using these approaches are typically expensive, suffer from limited sensitivity, are physically fragile, have limited useful lives, and are not suitable for widespread field deployment. Additionally, these detectors are disadvantageous in that many require active cooling in order to achieve high enough sensitivity for high energy resolution spectroscopic solid-state detectors (such as high purity germanium); high voltages for scintillators coupled to traditional photomultiplier tubes (PMTs); exhibit environmental sensitivity (e.g. hygroscopic or water-absorbing nature of some scintillator materials as, for example, sodium iodide); and the necessity of physically stable platforms on which the detectors can be mounted. Furthermore, use of these conventional systems often requires trained personnel that are not always available. The systems used to perform such detection for large objects are generally large, expensive, and complex.

Integrating Dosimeters

Routine activities at nuclear facilities, such as power plants, medical, national nuclear laboratory systems, and other industrial facilities employing radiation, have long required the affordable, continuous monitoring of every individual worker as well as the areas around them. This has been accomplished through dosimeters that accumulate signal over time (i.e. are "integrating") and are read out electronically later under controlled conditions. These detectors, which include film, optically stimulated luminescent (OSL) or thermoluminescent (TL) materials, are small, inexpensive, have no moving parts, and require no electronics.

Although these systems are inexpensive, durable, and extremely sensitive, they do not have the ability to discriminate radiation types (i.e. they lack specificity). As such, they cannot distinguish between benign or naturally occurring radiation and radiation of concern. Furthermore, they do not supply critical real-time information needed to immediately signal the presence of illicit radiation. It is necessary to remove such detectors using human intervention from the location in which they were deployed so that the reading out of the data can be made using dedicated equipment in a thermally and light controlled environment. These passive, integrating dosimeters generally cannot be used for unattended real-time radiation detection 'in the field.' The time delay associated with remote processing can prevent prompt action and such delays can present serious problems.

What is needed for radiological dispersive device (RDD) detection as well as the other applications mentioned herein is a detection/monitoring system that can identify the type and energy of the radiation it measures and thus the isotopic source, and then readily collect and report the data to a coordinating center for analysis. For prevention, a method is needed that uses tamper proof sensors that can detect and identify radiation sources at sufficiently low cost that they can be placed on all shipping containers, trucks, and portals at border crossings, around nuclear plant boundaries, within medical facilities, in other critical locations, and on other items or in places deemed critical. Boundary monitoring of nuclear facilities worldwide to challenge potential diversions of radioactive material should also be possible either covertly or openly. These measurements must be accomplished in a timely fashion both with regard to the time involved in making the measurements themselves and in transmitting the information for analysis.

General Background about OSL and TLD

Optically Stimulated Luminescence (OSL) and thermoluminescent (TL) radiation detectors work in the following general way. Electrons within a non-conducting or semi-conducting material normally exist at an energy level known as the valence band. Through some external physical process such as an interaction with high energy (ionizing) radiation, in some materials these electrons can be excited into another, higher energy region known as the conduction band. Within this band, the electrons are free to move around, but they will always attempt to return to their lowest energy place, the ground state, in the valence band. When they are able to make this transition they must give up the energy they acquired by interaction with the radiation and in so doing OSL and TL materials emit that energy in the form of light photons which, if they escape the material, can be observed and measured. The emitted photons create the correlation between the radiation event(s) and the determination of the source intensity.

In OSL and TL materials, between the valence band and the conduction band exists an energy range, the 'forbidden' region in which the electrons can only remain if they exist in 'traps' generally produced by impurities introduced into the base material. Instead of returning to their ground states, some electrons that were elevated to the conduction band as a result of the absorption of a portion of the energy from ionizing radiation will be 'caught' in these traps. They cannot then fall back to the ground state unless sufficient energy is provided for them to return to the conduction band (some models describe this process as migrating to a luminescence center). In TL materials, the energy to liberate trapped electrons is supplied as heat, whereas in OSL materials the energy is supplied in the form of light photons. Once in the conduction band, the electrons may return to their ground states, with the emission of light.

The amount of energy required to return the captured electron to the conduction band is equal to the difference in energy levels between the impurity energy state and the conduction band. The wavelength of the emitted light corresponds exactly to the difference in energy levels between the conduction and the valence bands. For OSL and TL materials to be generally useful for dosimetry purposes, the excited electrons must remain in the traps until they are stimulated into returning to their ground states. This stimulation can be provided by exposing the material to light of an appropriate wavelength for OSL, or heating to a given temperature for TL.

Figure 1:
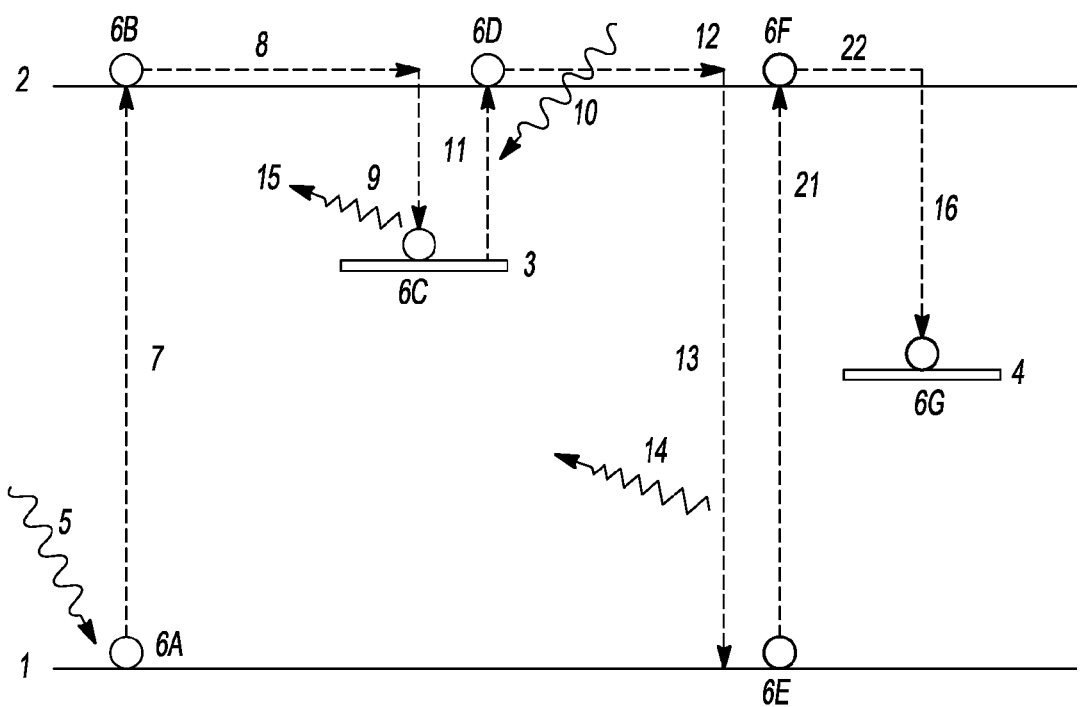
FIG. 1 is a schematic view illustrating the theory of operation of optically stimulated luminescent (OSL) and thermoluminescent (TL) materials.

The overall OSL and TL phenomena are illustrated in FIG. 1. Electrons in an unexcited material will exist in some valence or ground state (1), having energy $E_{ground}$. They may be excited and exist in a conduction band (2), which has an associated energy $E_{conduction}$. In some materials, there may exist impurity traps, such as (3) and (4). These will have energies $E_{shallow\ trap}$ and $E_{deep\ trap}$ associated with them. For this hypothetical illustration, trap (4) is a deeper trap and more energy would be required to liberate the captured electron from it. The fading of signal stored in this trap would occur at a slower rate than electrons trapped in trap (3).

When ionizing radiation, depicted as (5) in FIG. 1, having and energy $E_{ionizing}$ interacts with a material, ionization occurs. Some of this energy may be given to an electron (6a) in the ground state. If this energy is greater than the difference between energy levels of the ground state and the conduction state, i.e. ($E_{conduction}-E_{ground}$), then the electron may be elevated from the ground state (1) to the conduction band (2), through a process of excitation (7). Following this, the electron (6B) may migrate in the material (8) throughout the conduction band. If this electron falls into an impurity trap (3), through some process (9), some of its energy is released as a photon (15). The amount of energy released during this process, i.e. the energy of the emitted photon $E_{emitted\ photon}$, is equal to the difference in energy levels of the ground state and the conduction state, i.e. ($E_{conduction}-E_{ground}$).

At some future time, if some energy in the form of heat or a light photon is provided (10), which has an energy $E_{stimulation}$ that is greater than or equal to the difference in energy levels of the ground state and the conduction state, i.e. ($E_{conduction}-E_{ground}$), then the electron may be raised back to the conduction band (2), through a process (11). This electron, 6D, may then migrate in the conduction band (12), where it has some probability that it will return (13) to the ground state (1) with the emission of a photon (14) which has an energy $E_{emitted\ photon}$, equal to the difference in energy levels of the ground state and the conduction state, i.e. ($E_{conduction}-E_{ground}$).

For use of the material as an integrating radiation detector, at some point the detector is exposed to ionizing radiation, depicted as (5) in FIG. 1, resulting in electrons in traps (3) and (4), namely where (6C) and (6G). The electrons will remain where they have been trapped, with the exception of some statistical losses arising from background light and heat, until energy, $E_{stimulation}$, such as (10) is provided to liberate the electrons. This energy, $E_{stimulation}$, must be at least ($E_{conduction}-E_{shallow\ trap}$) and ($E_{conduction}-E_{deep\ trap}$) to effectively liberate the electrons from the shallow trap (3) and deep trap (4) respectively. Note that the incident ionizing radiation (5) may produce multiple electrons in the conduction band (2), since the amount of energy required to cause elevation of electrons, i.e. ($E_{conduction}-E_{ground}$), is much larger than the energy of the emitted photon $E_{emitted\ photon}$. The detection of these photons (14) forms the basis of TL and OSL radiation detection.

Electrons in the conduction band (6B, 6D, and 6F) may also be caught in the traps having the same energy as trap (3), caught in traps of type (4) having larger energy differences than those of trap (3) from the conduction band (2), return having other energies, or return directly to the ground state (1) at any time. Electrons (6c) captured in shallow traps are more likely to migrate back to the conduction band (2) than electrons captured in deeper traps (4). The movement of electrons from the traps to the conduction band can occur to some degree under normal background conditions, for which ambient temperature and light provide stimulation, since this process is statistical in nature. This process is called fading. It occurs for both OSL and TL materials. The fading of stored signal from the shallow traps will occur more rapidly than for the deeper traps under background conditions.

TL and OSL materials may have one or more impurity levels, occurring at different energies relative to the conduction band. Differing amounts of energy are therefore needed to obtain the information from the electrons in each of these impurity levels. Room temperature exposure does cause some of the trapped electrons in TL materials to move into the valence band, since that overall process is statistical in nature. As a result, the stored signal in a TL detector tends to "fade" over time. Similarly, extraneous light exposure may cause the fading of OSL signals. In a field environment, protection against extraneous light exposure is generally easier to maintain than temperature control. The rates of signal fading are either known or measurable, and are characteristic of both the base materials and the impurities for both TL and OSL materials.

Figure 2:
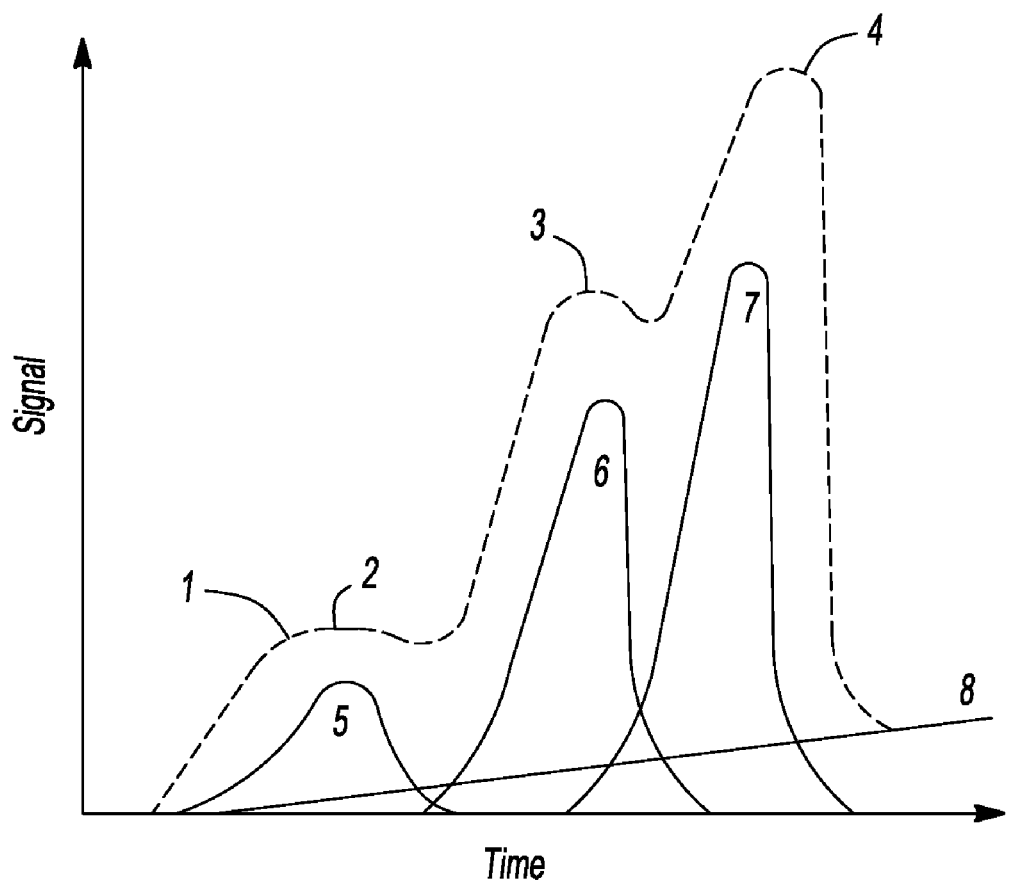
FIG. 2 is a heating protocol and the resulting glow curve data and analyzed glow curve peaks for TL dosimetry.
Figure 2:
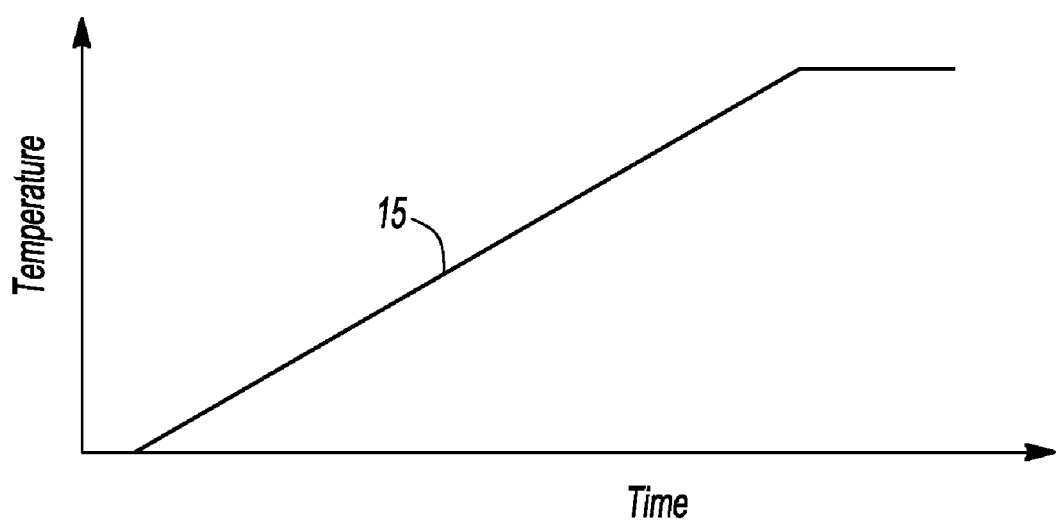

When signal is extracted, the stimulation may be varied as a function of time to obtain information from the different trapping levels. The general process is illustrated in FIG. 2. An experimental glow curve (1) is obtained by heating a material to progressively higher temperatures, in accordance with some time temperature profile (TTP) (15). In this hypothetical example the temperature is increased in a linear ramp to some maximum. The glow curve (1) has several peaks in it (2), (3), and (4) which correspond to the maximum signals arising from traps T2, T3 and T4, each having a progressively higher energy being required in order to release the electrons.

In glow curve analysis, the curve 1 of FIG. 2 may be fit by a variety of means into several components, (5), (6) (7) and (8) for this example. The entire curve is described mathematically by the sum of the mathematical descriptions of the individual features. Here (5) corresponds to the signal arising from the trap associated with (2), (6) corresponds with the signal from the trap that resulted in the peak (3) in the experimental data (1), and (7) corresponds to the peak (4). The curve (8) represents an overall background level, fit in this example as linearly increasing with temperature, used to provide a better fit for the experimental data.

Overview of the Present Teachings

Several methods presented exploit the integrative nature of OSL and/or TL materials to obtain a greater sensitivity to the detection of radiation. In other words, because the methods allow the collection of radiation data over extended, but adjustable, durations and reading of the data can be carried out rapidly, and in some implementations synchronously, signal to 'noise' ratios can be improved and higher sensitivity obtained. This brings the additional benefits of decreasing measurement times and dramatically reducing costs. Because signals from different TL and OSL materials fade at different rates during ambient conditions, approaches are described to obtain temporal information from systems employing dosimetric materials using a variety of analytical methods.

When OSL or TL materials are chosen that exhibit known 'fading' characteristics, and in particular, known fading characteristics at emission wavelengths corresponding to different energies of the nuclear radiation excitation, information about the dose rate as a function of time and/or about the integrated dose over distinct time periods, can be obtained. These, and other dosimetric methods, may be improved through the use of unique approaches to the extraction of the signals corresponding to different peaks, otherwise known as glow curve analysis. Several new methods that lessen the importance of glow curve analysis are presented.

The fading of signals further allows signals to approach equilibrium values reflective of time periods characteristic of the particular signal being measured, doing away with the need for in-field erasure of the dosimeters while enabling another method for temporal dosimetry using integrative dosimeters. Methods of correcting for the effects of environmental conditions and tampering are described herein.

Methods and apparatus that allow information to be obtained about the type and energy from integrative detectors are included. Modifications of these methods allow the direct identification of the radiation source, whether this is a radioisotope or a radiation-producing device. Information about strength of these sources is also obtained. One approach to radiation source identification involves the usage of specialized filters or shields. Another method uses dosimeters comprising optically stimulated luminescent (OSL) and/or TL materials whose different nuclear radiation-induced excited electronic sites can be stimulated, in-situ, to emit optical radiation with different intensities and wavelengths. Variations in the stimulation sequence and/or the emitted wavelength and signal intensity are used to extract the radiation type and energy information, or, more directly, the radiation source type itself.

The design and methods associated with read-out apparatus and dosimeter forms to accomplish the desired results are described following. The described methods and systems enable the establishment of networks of radiation detectors. Data from these networks can be interpreted and managed using a variety of methods not possible for individually deployed radiation detectors. All of these methods and systems and combinations of them are very useful for solving the radiation detection problems discussed previously.

Integrated Retrospective Dosimetry Methods

Environmental and personnel radiation dosimetry is typically performed using thermoluminescent detectors (TLDs) or optically stimulated luminescent detectors (OSLDs). These detectors cannot distinguish between chronically- and acutely-delivered doses. An inexpensive, broadly deployable method capable of distinguishing radiation exposures occurring in smoothly varying fashions (e.g. constant or slowing varying background) from multiple all-at-once radiation exposures (e.g. nuclear materials passing through a checkpoint) has been developed. The method, which also provides accurate environmental dose information, exploits the phenomenon of signal fading of materials and systems already in use worldwide for personnel and environmental radiation dosimetry, namely, TL and OSL. Materials are selected or designed which have emission peaks occurring at different stimulation temperatures or wavelengths. These are chosen to have different signal fading rates appropriate to the monitoring time period of interest. The new method involves a mathematical deconvolution of equations that relate the signals arising from different emission peaks occurring at different stimulation temperatures or wavelengths as a function of their fading and temporal efficiency functions. These signals may be extracted from TL glow curves or OSL emission spectra. Emissions with different known temporal response functions can also be separated into different portions of the signal that fade at different rates through the wavelength or sequence of stimuli used to elicit the signal from the material. These methods allow complete characterization of both chronic background and multiple acute exposures at different times, making the system applicable to practical exposure conditions. Through careful selection of materials, filters, and/or stimulation sequences the method may be applied to detect and discriminate gammas, x-rays, betas, alphas, and neutrons.

Figure 3:
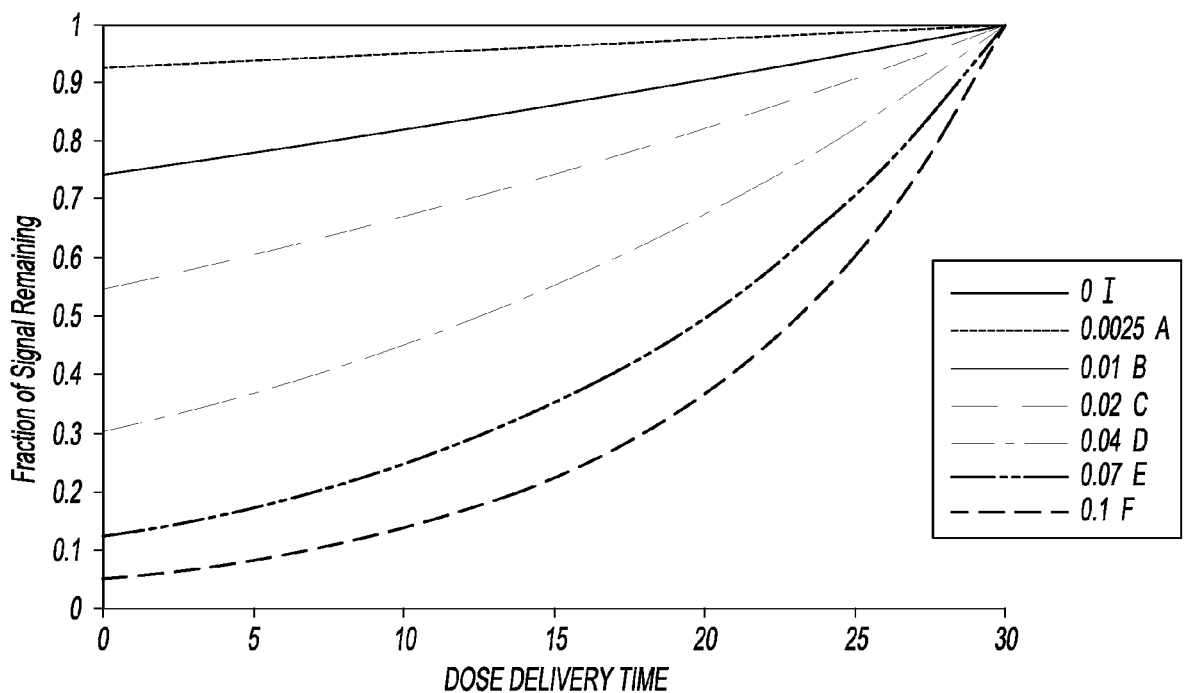
FIG. 3 is a graph illustrating a response as a function of the time of delivery of a single pulsed dose for specific readout time (30 arbitrary time units post-annealing) for different values of signal fading constant (expressed as inverse arbitrary time units)

For simplicity, assume that there is no change in the efficiency of a given dosimeter signal as a function of time since annealing (the clearing of all signal). Also assume that the fading function can be represented by a single exponential function, i.e. $S=S_0 e^{-kt}$, where 'S' is the signal at the time of readout, '$S_0$' is the signal if there were no fading present, 't' represents the time, and 'k' is the time between the delivery of the dose and the time of the readout. The fractions of the signal remaining for different times following single dose events are shown in FIG. 3 for this simple case. The x-axis (H) represents the time that the dose is delivered after the initial deployment of the dosimeter, while the y-axis (G) represents the fraction of the initial signal that is remaining at the time the dosimeter is read out, here at time 30 in arbitrary units. The curve (I) represents the situation for which a signal does not fade. The different curves (A), (B), (C), (D), (E), and (F) represent the observed fractions for increasingly rapid decay of signal, with corresponding exponential decay parameters 0.0025, 0.01, 0.02, 0.04, 0.07, and 0.1 per unit of arbitrary time. FIG. 3 shows that the relative values of the signal change in different ways as functions of time, and thus independent equations will result which may be solved. This reveals that for an integration time of 30 arbitrary time units, fading rates covering a range of 0.0025 to 0.1 per unit time will yield appropriate data to characterize the dose rate as a function of time for up to six distinct time periods between the time of deployment and the readout time. Note that including a peak with negligible fading over the time of interest will allow normalizations for variations in sensitivity, providing greater stability to the method while providing absolute dose measurement. The new approach requires the use of several peaks with different fading rates spanning this interval.

Typically, materials and thermal processing schemes for environmental and personnel dosimetry are designed to avoid peak fading. However by altering the thermal cycles applied to the materials and applying standard glow peak analysis methods, this information may be retained. In addition, materials previously rejected for radiation dosimetry applications where fading is undesirable are of particular use for this application. The following table shows several TL materials and their corresponding glow peak temperatures, each of which has a unique fading rate at ambient temperature.

| Material | Glow Curve Peak Temperatures (° C.) | | | | | | |
|---|---|---|---|---|---|---|---|
| $Al_2O_3$ | 20 | 125 | 175 | 250 | 280 | 325 | 475-625 |
| $BaF_2$: Dy | 120 | 250 | | | | | |
| $BaSO_4$: TB | 130 | | | | | | |
| BN (Mn) | 130 | 260 | 450 | | | | |
| $CaF_2$: Dy | 120 | 140 | 200 | 240 | 340 | 400 | |
| $CaF_2$: Tm (approx) | 80-100 | 150 | | | | | |
| $CaSO_4$: Dy or Tm | 65 | 85 | 105 | 125 | 175 | 220 | 280-485 |
| $CdSO_4$: Eu | 130 | | | | | | |
| $Li_2B_4O7$ | 50-120 | 200 | | | | | |
| LiF: TI | 65 | 120 | 160 | 195 | 210 | 235 | 270 |
| $MgB_4O_7$: Dy/Tm | 130 | 210 | | | | | |
| $SrSO_4$: Tb | 140 | | | | | | |

The numbers in the table represent the temperatures, expressed in units of degrees centigrade, of the major peaks for the selected materials. As shown in the table, these materials may have one to six or more peaks, with temperatures associated with their peaks ranging between 20 and 625 degrees centigrade. For measurement periods of approximately one month, a selection of peaks with TL temperatures of 110-150 degrees centigrade is desirable. As seen in the above table, several such materials and peaks exist.

Figure 4:
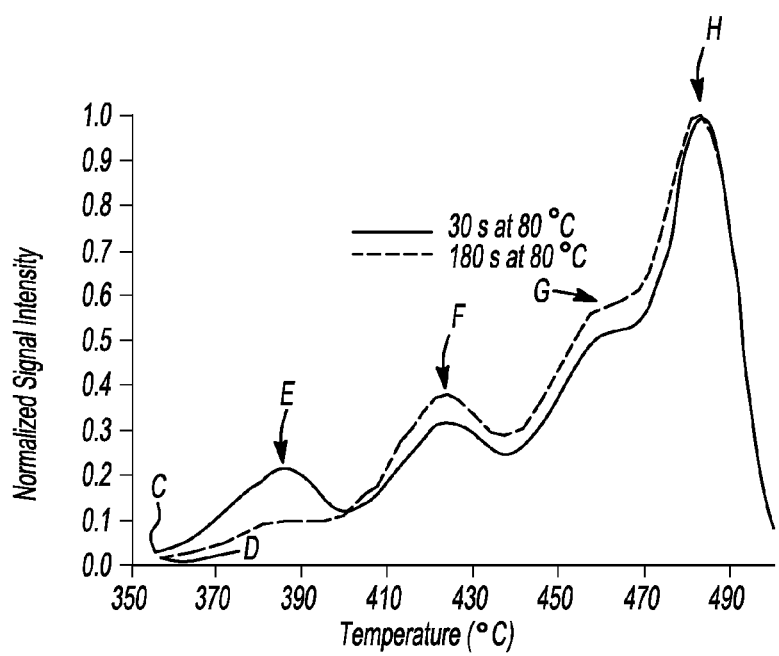
FIG. 4 is a graph illustrating the measured lithium fluoride glow curves for individual samples heated for different amounts of time prior to readout that shows the different relative fading of peaks having different signal fading rates (or TL temperatures) associated with them.

An accelerated fading experiment was performed to demonstrate the operation of the new method for single pulses of radiation. Lithium fluoride dosimeters were irradiated to 10 mSv (1000 mrem), then heated for different lengths of time at 80 degrees centigrade to accelerate fading. FIG. 4 shows two representative measured glow curves, using a 1 degree centigrade per second heating scheme with no pre-annealing for lithium fluoride dosimeters heating between 30 seconds and 150 seconds at 80 degrees centigrade. The normalized signal intensity (A) is shown as a function of the temperature in degrees centigrade (B). The upper curve (C) represents the glow curve for the dosimeter heating for 30 seconds at 80 degrees centigrade, while the lower curve (D) represents a dosimeter that was heated for 180 seconds at 80 degrees centigrade. As seen in FIG. 4, there is very little difference in the highest temperature peak (H) for the shorter (C) and longer (D) heating times. Some decrease in the more rapidly fading signal peaks (F) and (G) is apparent. The change in relative height of the first, fast-fading glow peak (E) is readily shown in FIG. 4.

Figure 5:
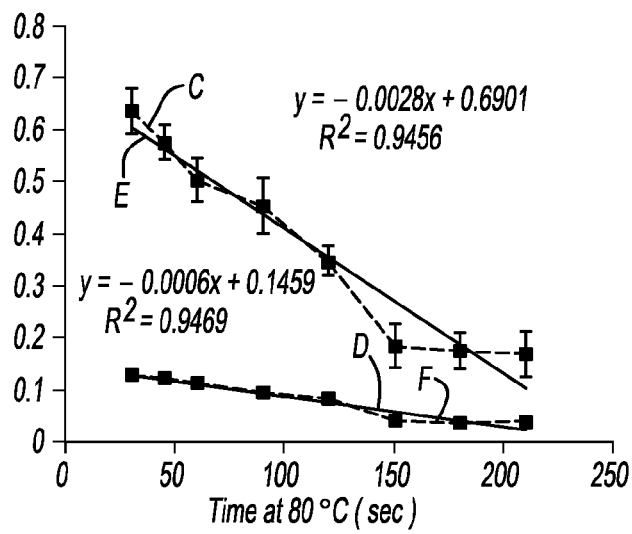
FIG. 5 is a graph illustrating the ratio of measured peak areas of fast fading to other peaks as a function of time held at an elevated temperature prior to readout.

Gaussian fits were performed on the glow curves, and the peak areas then determined. The results of the experiment are summarized in FIG. 5. The ratio of measured peak areas of fast fading to other peaks, plotted as the y-axis (A), as a function of fading times shown on the x-axis (B). The upper set of data points and connecting curve (C) is the ratio of the area of Peak 2 (E in FIG. 4) to the area of Peak 3 (F in FIG. 4). The lower set of data points and connecting curve (D) is the ratio of the area of Peak 2 to the sum of the areas of Peaks 3, 4, and 5 (Peak 5 is H in FIG. 4). Solid lines (E) and (F) represent linear least squares fits of data, while dashed lines connect data points. Estimates of error in the lower curves are smaller than the data points shown. This shows the excellent correlation between peak area (normalized to areas of non-fading peaks) and the time of exposure. It also affirms that fading may be used as a method for the determination of temporal dose rate using integrative dosimeters.

The ratio of one fading peak to a non-fading peak is sufficient to determine the time at which a single pulse of radiation was delivered. Such a method has been described in the literature and examined for possible application to the determination of the time of an "accident" during a given personnel monitoring period. However, it was never broadly implemented. The single ratio approach is limited in that it does not allow the distinction between a chronic lower-exposure rate dose rate, multiple pulses of radiation, and an acute dose delivered in a single pulse. This prior approach also does not allow the assumption of other than very simple functions describing fading as a function of time. In addition, changes in sensitivity of different peaks have been observed at a variety of times post-annealing, and this cannot be taken into account with these simple methods.

Figure 6:
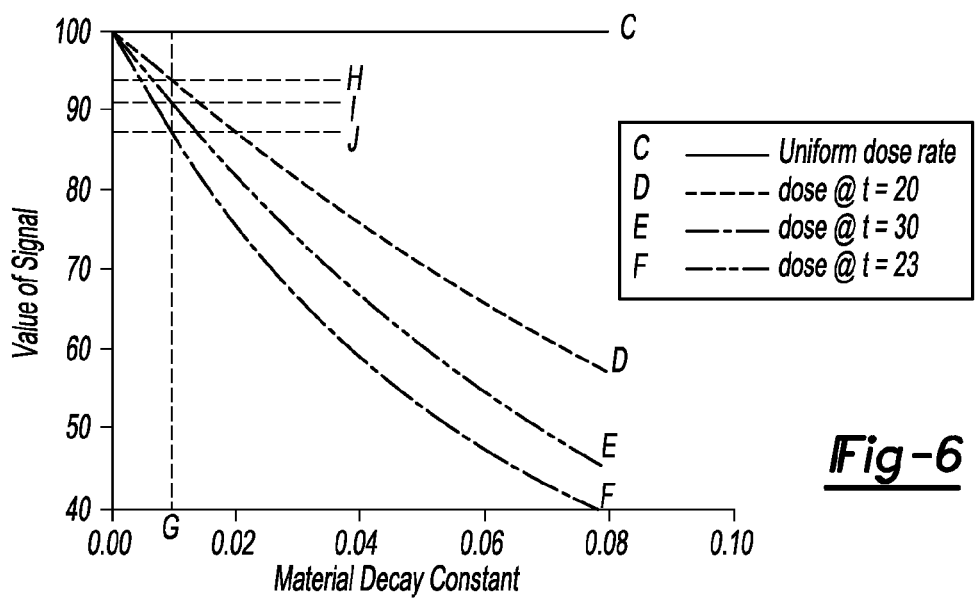
FIG. 6 is a graph illustrating the response of fading dosimeter system for different times of delivery of a pulsed dose, with dose times and material decay constants expressed in arbitrary time and inverse time units (case shown is for a material having a signal-fading rate that is slow relative to the time of interest)

The limitations of using a single ratio for determining the time of a pulse of radiation are illustrated in FIG. 6, obtained using simulation that assumes simple exponential fading and no post-annealing changes in peak efficiency. In this diagram, the independent variable is the normalized value of the signal at the time of readout (A) plotted along the x-axis. This is shown as a function of the exponential parameter that characterizes the signal decay (B), plotted as the independent variable on the x-axis of the diagram. The top, flat curve (C) corresponds to a situation for which a uniform dose rate occurs throughout the time period of interest. The curves (D), (F), and (E) correspond to the situation which would occur if doses were delivered at times 30, 23 and 20 arbitrary time units before readout.

As shown in FIG. 6, for small fading rates a single dose at time t 23 is difficult to distinguish from an equivalent dose distributed uniformly over time, or single doses at times t=10 and t=30 for a dosimeter integration time of t=30. This is clear by considering a material having an exponential fading rate parameter equal to 0.01 (G). This results in values if signals of (H), (I), and (J) for the dose at 20 time units, 23 time units, and 30 time units respectively. These values are not dramatically different, so the accuracy and precision in determining the time of the chronic exposure, especially in the presence of measurement noise, will be limited.

When materials having different fading rates are selected, and more than one ratio is used to make the determination of the time of exposure, however, the differences in the time of delivery of an acute dose and a uniform dose become apparent. Consider, in FIG. 7, that three materials are used. For argument purposes let these have signal fading constants of 0.02 (G), 0.04 (H), and 0.06 (I). For the uniform dose scheme (C), the signals for all of these materials will be the same, equal to 100 for the normalization shown in the diagram. For a single dose delivered at time t=30 arbitrary units, values of (J), (K), and (L) will result for the signals at the time of readout for each of these materials, respectively. If the dose rate had, in fact, occurred at time t=30 arbitrary units, then the values of these signals, (M), (N), and (O) respectively, would have been noticeably different. However, if reliance was made upon only a pair of peaks or signals from materials having different peak fading rates, then an error in a single reading can cause the system to be unreliable. Having a method that relies upon multiple readings is superior.

Some methods of this invention involve the measurement of multiple peaks having different fading rates and then (a) mathematically determining the shape of the dose delivery curve when signals from multiple peaks having different fading rates are analyzed; (b) using information from more than one peak or ratios of peaks to determine the time of an acute radiation exposure (an extension of the method presented in FIG. 5) either by averaging or the use of a fitting method; or (c) using an iterative computer fitting algorithm and the signal variety of ratios of peaks (an extension of the method presented in FIG. 5) to obtain the dose rate as a function of time.

Temporal Dosimetry Methods Using Equation Set Solution

The set of equations that can be solved for dose delivery as a function of time, through mathematical de-convolution or a selection of other methods, are outlined here. If the dose is delivered to the dosimeter at a variable dose rate D' as instantaneously measured at time 't', i.e. in accordance with some function D'(t), then the total response of the detector, R, analyzed at a readout time, $t_{readout}$, is a function of the dose delivered, the sensitivity of the detector at the time the dose is delivered, and the amount of fading that a given signal undergoes. This is expressed mathematically for a series of varying doses by:

$$R_i(t_{readout}) = \int_{t_{anneal}}^{t_{readout}} D'(t) F_i(t_{readout} - t) \varepsilon_i(t - t_{anneal}) \, dt \quad (1)$$

where 'F' represents the temporal dose response function for the detector, i.e. the fading function, or the fraction of the signal remaining at a time ($t_{readout}$−t) following the irradiation time 't', for the peak 'i'.

The sensitivity of an integrative detector may vary with the time that elapses between the initial annealing (clearing of signal) of a detector, '$t_{anneal}$', and the time that the dose is delivered to the detector. In Equation (1) above, 't' may be considered to be the time the dose is delivered to the detector. In Equation (1), this sensitivity function is expressed as '$\varepsilon(t - t_{anneal})$'. Note that F(0)=1.0, since if no time has elapsed between the dose delivery and readout, no fading will have occurred. Similarly, note that $\varepsilon(0)$=1.0 since the efficiency function will be normalized to a value of one at the time of annealing.

If 'n' materials are used, each having a different fading function, then 'n' total equations of the form of Equation (1)

will result. This set of equations can be solved numerically, which is made clear when the situation is formulated in a discretized fashion.

Consider an average integrated dose '$D(t_k)$', delivered in a time interval centered at time '$t_k$'. For the $i^{th}$ peak, corresponding to a given OSL or TL impurity trap energy level under consideration (peaks may come from different traps within the same material or from different materials), the fading function 'F' and efficiency function '$\epsilon$' will be unique. The total response for that peak will be the sum of the responses for doses delivered during each of 'm' timing intervals (assumed for convenience to be separated by the same time lapse, although that does not have to be the case) that occur between annealing and readout, specifically:

$$R_i(t_{readout}) = \sum_{k=1}^{m} D(t_k) F_i(t_{readout} - t_k) \varepsilon_i(t_k - t_{anneal}) \quad (2)$$

One equation of the form of Equation (2) exists for each peak in the selected materials, resulting in a set of differential equations. This set of equations may be solved for as many dose delivery times as peaks selected. For example, for 'i' peaks (in a single or in multiple materials), and 'm' time points, the following set of equations results:

$$R_1(t_{readout}) = \sum_{k=1}^{m} D(t_k) F_1(t_{readout} - t_k) \varepsilon_1(t_k - t_{anneal}) \quad (3a)$$

$$R_2(t_{readout}) = \sum_{k=1}^{m} D(t_k) F_2(t_{readout} - t_k) \varepsilon_2(t_k - t_{anneal}) \quad (3b)$$

M $$R_i(t_{readout}) = \sum_{k=1}^{m} D(t_k) F_i(t_{readout} - t_k) \varepsilon_i(t_k - t_{anneal}) \quad (3c)$$

If i>m, then the above set of equations denoted by Equation (3) may be solved for the best values of the doses delivered during each distinct time interval, denoted '$D_1$', '$D_2$', . . . , '$D_k$' that satisfy the above equations. This may be accomplished through a variety of known numerical and trial-and-error methods.

If i=m=n (i.e. the situation in not oversampled), then the above set of equations denoted as Equation (3) may be expressed in matrix format as the following:

$$\overline{R} = \overline{D} \times \overline{\overline{G}} \quad (4)$$

where $\overline{R}$: a (1×n) matrix = $\begin{bmatrix} R_1 \\ R_2 \\ M \\ R_n \end{bmatrix}$ = the measured signals for 'n' material peaks $\overline{\overline{G}}$: a (n×n) matrix =
$\begin{bmatrix} F_1(t_{readout}-t_1)\varepsilon_1(t_1-t_{anneal}) & F_1(t_{readout}-t_2)\varepsilon_1(t_2-t_{anneal}) & K & F_1(t_{readout}-t_n)\varepsilon_1(t_n-t_{anneal}) \\ F_2(t_{readout}-t_1)\varepsilon_2(t_1-t_{anneal}) & F_2(t_{readout}-t_2)\varepsilon_2(t_2-t_{anneal}) & K & F_2(t_{readout}-t_n)\varepsilon_2(t_n-t_{anneal}) \\ M & M & M & M \\ F_n(t_{readout}-t_1)\varepsilon_n(t_1-t_{anneal}) & F_n(t_{readout}-t_2)\varepsilon_n(t_2-t_{anneal}) & K & F_n(t_{readout}-t_n)\varepsilon_n(t_n-t_{anneal}) \end{bmatrix}$
= known response functions for each peak at different dose delivery times $\overline{D}$: a (1×n) matrix = $[D(t_1) \; D(t_2) \; K \; D(t_n)]$ = the unknown dose as a function of time In the above set of equations, denoted by Equation (4), 'R' is measured at readout times '$t_{readout}$' for different signal peaks 'j'. The values of '$t_k$' are fixed by the numerical implementation of the problem. The functions 'R(t)', 'F($t_{readout}-t_k$)' and '$\epsilon(t_k-t_{anneal})$' are known for each material and/or peak combination given a value of elapsed time between the delivery of the dose and the readout, '($t_{readout}-t_k$)'. The values of '$D_k$' are unknowns for each 'k' corresponding to a different time point, with 'n' total time points specified. The above may be readily solved using a variety of standard numerical analysis methods. The method is readily applicable to thermal-, optical-, IR-, UV-, or other types of stimulated luminescent materials.

When TL materials are heated to sufficient temperatures, they release their stored signals. As the temperature is raised, more of the stored signal is released. As shown in "glow curve" of FIG. 4, peaks arise when the temperature becomes high enough to release electrons from progressively deeper and deeper traps. However, in many materials, there is overlap between the peaks. This complicates analysis or separation of the individual peaks. Analysis of these individual peaks would be one way of obtaining data for temporal data, since the value of the peak height or the integral underneath each peak would constitute an equation of the form of Equation (1). A method for separating out the glow curve peaks that occur in a TL material can be found in U.S. Pat. No. 4,827,132, which is incorporated herein by reference. The teachings of which rely upon having multiple peaks from a given material and being able to analyze the glow curve in that manner.

In U.S. Pat. No. 4,827,131, Moscovitch proposed that the ratio of these peaks might be used to determine the time that had elapsed since the irradiation. The patent notes that this can be accomplished through use of parametric fits of the peak function, the maximum heights of the peaks, and with or without the peak heights or integrals normalized to those of the most slowly fading peak.

However, the teachings of the present disclosure provide that temporal dosimetry can be accomplished using more than one material—perhaps different materials with distinct glow curves. According to the principles of the present teachings, additional equations of the form of Equation (1) arise from the use of distinct materials, such as, by example, both lithium fluoride and calcium sulfate TL dosimeters.

The abovementioned patents further restrict themselves to TL materials. However, the present teachings employ OSL materials having differing designed fading rates to form the basis for temporal dosimetry. One or more OSL detectors of different materials or an OSL material having traps that fade at different rates can be employed. Unlike TLDs, OSL detectors would be less subject to the variations in heating rates and environmental temperatures during deployment. These are of continuing concern to the users of TLDs and will confound the practical implementation of temporal dosimetry methods that employ them. Each OSL material, or corresponding data from the different traps within a specific OSLD, will result in a signal described by Equation (1).

TLD and OSL detectors can also be combined in a single dosimeter, resulting in more equations. These materials can be maintained separately, or mixed. In addition, materials having both TL and OSL properties can be analyzed by the method. Using a combination of TLDs and OSLDs in the same system may help in sorting out environmental effects as well as temporal effects. The TLD is sensitive to temperature variations, while the OSL is light sensitive. Both should give the same results, and variations between them can be due to excessively high temperatures, unusual conditions of humidity, exposure of the materials to bright light of specific wavelengths, other extreme environmental conditions or tampering.

The larger the number of peaks or measurements, each resulting in an equation of the form of Equation (1) included in the system of equations to be solved, the greater will be the number of time intervals possible for the dose determination. Alternatively, the doses may be determined for a smaller number of time intervals, such that the situation becomes over sampled and a more stable or accurate solution may result. Best-fit methods may then be used to solve for the dose as a function of time.

U.S. Pat. No. 4,827,131 fails to indicate any method of determining elapsed time for respective time ranges. The solution is not obvious since the only analysis method given for the determination of elapsed time is the ratio of two peaks. Taken alone, the ratio of two peaks will only permit the determination of the time elapsed since a single, acute dose of radiation. This reveals nothing about how the dose may have varied as a function of time when a chronic, but changing dose rate is occurring. The present invention concerns itself with the specifics of doing that.

The basic idea is that the signal at any given time is the integral of the dose rate, the fading function based upon the time between the delivery of dose during a given subinterval of time and the readout of the detector, and the efficiency function dependency it may have upon the time lapsed between detector annealing and readout. The fading and efficiency functions may be characterized for a given individual dosimeter or dosimeters within a given batch, or for all dosimeters, depending upon the variability of these characteristics. The post-annealing temporal variation in the individual peak efficiencies is not mentioned in U.S. Pat. No. 4,827,131. This temporal variation has been noted in the literature, and its recognition is important for any temporal dosimetric method to work in the field.

Multiple signals are obtained, from either different traps or materials having different traps, which may be OSL materials, TLDs, or combinations of these. Each signal will have associated with it a function, described by Equation (1), which relates this measurement to the dose rate as a function of time. Because these functions may be complex, simple solutions may not be possible. For the number of signals equal to the number of time integrals chosen for solution, the resulting system of equations may be written as a matrix, and matrix solution methods (such as matrix inversions) applied to obtain the dose rate as a function of time. If the form of the efficiency and fading functions is simple enough, then analytical solutions may also be possible.

If more measurements are made than desired time integrals, then numerical solution methods may be used to obtain best fits of the dose as a function of time. It is likely that matrix methods will be unstable in their practical application, and such over sampling would result in greater numerical stability and confidence in the solution. The resulting set of equations can be solved using a trial and error method, but it would be superior to solve these equations using stable and accepted numerical methods that will also result in a numerical indication of the goodness of fit. Examples of such methods include simulated annealing, neural networks, artificial intelligence, nonlinear optimization methods, back-projection, algebraic reconstruction technique, maximum entropy, maximum likelihood, nonlinear least squares, linear least squares, Tykonov regularization, Backus-Gilbert methods, Land Weber iteration, regularization by discretization methods, Galerkin methods, other collocation methods. Solution methods may include any iterative method for finding the best fit for the unknowns in the set of nonlinear questions, unless the equations may be approximated as linear ones. The best approach may be a curve stripping method with a positivity constraint that maximizes the entropy for the best possible stability.

Rather than considering the signals in Equation (1) above, either the temporal shape of the emitted light as a function of time (using a traditional heating method or an altered one as described previously) or the light spectrum, or number of emitted photons as a function of wavelength can be fit with appropriate functions. For a given material, particular variations in the fitted parameters can be related to the shape of the temporal dose curve. This can inform the selection of the shape of the temporal dose curve, or be used directly to determine the dose as a function of time.

Temporal Dosimetry Methods Assuming a Specific Temporal Dose Function Shape

Another approach to solving for the dose as a function of time is to assume a given functional shape for the temporal dose curve. The required fitting parameters, rather than the dose during pre-specified counting intervals, can then be found using numerical methods. Since a smaller number of variables would be involved, the method would suffer from even less numerical instability. If a good idea of the shape of the dose rate as a function of time is not known, several different shapes can be assumed with the shape resulting in the best fitting statistic then being chosen as the appropriate one.

Rather than solving for the dose rates at individual time points, as outlined in the method(s) herein, an arbitrary function may be assumed to describe the dose rate as a function of time. The system of equations similar to Equation (1) is then solved for the parameters associated with the function that describes the temporal dose rate. This decreases the total number of unknowns, thereby stabilizing the solution of the equation set. A goodness of fit parameter derived from the solution set for one assumed dose rate functional shape can then be compared to the results for one or more other dose rate functional shapes. The dose rate function that is fit the best by the data is then selected as the best solution for the dose rate as a function of time.

Example dose functional shapes can be acute doses occurring at a single time, step functions, linearly increasing functions, linearly decreasing functions, exponentially decaying functions, exponentially increasing functions, e.g. having form 1−exp(−kt), higher order polynomial functions, and other possibilities. Exponential functions can correspond to the radiological half-lives of various radioisotopes and their progeny, or first order linear processes of movement of radioisotopes through the environment such as leakage from tanks or biogeochemical transport.

Temporal Dosimetry Methods For Assumed Single Acute Exposure

A method of determining the time of an acute radiation exposure, i.e. a non-zero dose rate occurring during a short time period, with minimal dose delivered before and after this exposure, is possible which is more stable than using a single peak for the determination of the time of the acute exposure. The method is also extended in its range of temporal applicability by the choice of peaks and/or materials that have very different fading and temporal efficiency functions.

Consider the general expression for the signal, or response, developed as Equation (1) above, but modified using the assumption of a single acute dose, 'Dacute', delivered at time '$t_{acute}$'. This signal can be normalized to a signal available for non-fading peak. The equation becomes:

$$R_i(t_{readout}) = \int_{t_{anneal}}^{t_{readout}} D'(t) F_i(t_{readout} - t) \varepsilon_i(t - t_{anneal}) \, dt \quad (5)$$
$$= F_i(t_{readout} - t_{acute}) \varepsilon_i(t_{acute} - t_{anneal}) D_{acute}(t_{acute})$$

Equation (5) is solved for $t_{acute}$ for the given measured signal. This differs from the prior simple application of a single ratio in that any general form of fading and temporal efficiency functions are assumed. Account is also taken for the fact that the fading function depends in the difference in times between the delivery of the acute dose and readout, and the temporal efficiency function depends upon the time elapsed between annealing and the delivery of the acute dose.

An equation of the form of Equation (5) may be written for multiple peaks. Each of these can be solved for the time of the delivery of the acute dose, and these estimations averaged to obtain a new estimate. In an improved implementation, however, numerical best-fit methods may be applied to solve the over sampled situation for the best value of the time of dose delivery. During the numerical solution method weighting can be applied to those values of signal having less noise or other uncertainty. In addition, as the solution convergence on a best solution, the signals corresponding to the fading and efficiency temporal characteristics most suited to predicting times in the overall range of the solution may be given higher weighting. The results of using multiple signals to determine the time of an acute dose results in better precision, stability, and accuracy.

Methods of Individual Peak Signal Separation

The basic method of separating signals for analysis for TL materials was previously discussed with reference to FIG. 2. As shown in this diagram, traditional heating methods result in overlapping signal curves corresponding to peaks having different fading rates. This teaching suggests several methods of collecting or analyzing TL and/or OSL emissions for the proposed temporal methods, as well as for application to traditional dosimetry.

FIG. 8 illustrates a combination of hypothetical luminescence curves that would form the basis for a different temporal dosimetry determination. Consider a relatively typical method of heating a TLD material, i.e. a ramp of linearly increasing temperature as a function of time (1). A material of type M1 can be chosen because its glow curve (2), or signal emitted as a function of time during heating, is relatively simple, having only a single peak (3) occurring at temperature (time) T1. Another material M2 can have a slightly more complicated signal curve (4). For this example, two peaks (5) and (6) each corresponding to a different trap having a different energy separation from the conduction band. In this case (6) will fade less rapidly than (5) as more energy is required to liberate the electrons trapped within it. A third material M3 can also be considered, having a signal curve (7) with a peak (8) at temperature T4. Because separate materials are being used, there will be no interference among the various signals if they are read out separately.

If the temperatures T1, T2, T3, and T4 in FIG. 8 are sufficiently different that the peaks do not interfere, then the materials can be simultaneously read out with a single light collection device. In such circumstances a mixture of the materials may also work.

It is noted that for OSL, signals with different fading rates may be elicited by different wavelengths of stimulating light and different or simple materials chosen so that glow curve analysis is avoided. Combinations of materials with simple glow curves that differ in fading characteristics from each other would thus have distinct advantages over the familiar but poorly separated glow curves for lithium fluoride alluded to in U.S. Pat. No. 4,827,131.

U.S. Pat. No. 4,827,132 relies strictly upon the deconvolution of TL glow curves (fitting the curve data into a number of different distinct functions, each of which corresponds to a peak or other feature of the glow curve) for any data to be used in a method of determining the time lapsed since the dose delivery for a single dose, and, by implication, relies upon the same such processing for the determination of elapsed time for dose delivered in multiple respective time ranges. The present teachings provide unique methods of obtaining such data that would not be dependent upon these complex analyses for their operation.

A conventional heating method (a temperature ramp) and its corresponding signal showing an overlapping of information from different peaks are shown in FIG. 2. In the first method of the present teachings, the glow curves for TLDs would be obtained using a specially designed heating method (providing what is sometimes called the time temperature profile or TTP). For this method, the material would first be heated to a low temperature, and the resulting signal recorded. This signal can, in fact, be recorded as the integral of the signal emitted during the heating time. The initial temperature chosen would be such that the signal would be dominated by signal arising from the shallowest energy trap. The material can then be heated to a slightly higher temperature, chosen so that signal from the next deeper energy trap would be released. This would be repeated until the signals from each of the traps had been independently collected.

The different TL materials having different fading rates can also be processed independently as above. If these materials were chosen such that they have only single major peaks, then there would be no need for glow curve deconvolution or processing.

FIG. 9 shows a modified heating method that would automatically separate the peaks. The time temperature profile (A) resulting in the separated glow curve peaks (B) are also shown in this FIG. 9. In the initial time period from t0 to t1, a linear (or other) increase in temperature from background temperature T0 to a maximum T1 is used. From t1 to t2, the material is allowed to cool. This results in the signal from the lowest energy trap to be emitted, resulting in a peak P1 of magnitude S1 occurring at some time between t0 and t2. The temperature T1 and times t1 and t2 are chosen such that the signal from the trap that produced peak P1 has been completely cleared out by time t2 but signal from deeper traps is not liberated.

As depicted next in FIG. 9, heat is then applied to the material between times t2 and t3. This results in a rise in temperature from the temperature to which the material had cooled at time t2 to some temperature T2 at time t3. Between times t3 and t4, the temperature of the material may be held constant. The heating rate between times t2 and t3 need not be identical to the heating rate between times t0 and t1, and other shapes of heating curves are possible. However, the times and temperatures are chosen such that the signal from the electrons in the second deepest trap are completely cleared between times t2 and t4. The process is repeated by heating between t4 and t6 to release information held in the third trap, a peak P3 with signal S3. The process is repeated until all of the relevant information is retrieved from the dosimeter.

The temperatures and heating rates are chosen optimally for this method in order to separate the peaks for a given material or combination of materials. Other shapes of time temperature profiles are possible and may, in fact, be optimal for a given material. The chosen shape of the heating curve may also be different at different times, i.e. to get information from the different traps. Note that the magnitudes S1, S2, and S3 of peaks P1, P2 and P3 in FIG. 9 are functions of both the material property as well as the amount of time lapsed between irradiation and readout. Thus data can be obtained without needing to resort to complex numerical glow curve deconvolution and/or curve fitting methods which introduce additional error into the dosimetry methods, potentially rendering temporal dosimetry impractical.

One way of achieving a heating protocol similar to FIG. 9 would be to use an intense light source, such as a laser. A short pulse would be administered which would only allow heating to a low enough temperature to release signal from the least energetic trap. A longer pulse can then follow. Since the signal from the least energetic trap would already have been read out, the second pulse would release only signal from the next most energetic trap. This can be repeated until all of the desired information has been read out.

One such pulsing scheme is illustrated in FIG. 10. A pulse (A) of a given intensity I1 is administered from t0 to t1, so that the intensity and duration of the pulse t1–t0 is sufficient to extract all of the information held in the lowest energy trap 1, resulting in a peak P1 having magnitude S1. The duration and intensity of the pulse A is chosen such that it is insufficient to clear information from the next most deeply held trap 2. Time t2 is chosen so that the entire signal arising from trap 1 has been obtained.

As depicted in FIG. 10, at time t2, a pulse B is administered, which has an intensity I1, likely greater than I1. It is administered until time t3, for a total duration of t3–t2. The intensity and duration are chosen so that all of the information from trap 2 can be obtained, but information from the next most deeply held trap is not given. This results in the emission of signal with a peak P2 of intensity S2. Following the complete release of this signal at time t4, a third pulse C may be administered until time t4. This pulse is chosen to completely clear trap 3, resulting in an emission of light with a peak P3 of magnitude S3.

Both pulse intensity and pulse duration may be adjusted for optimal performance of these methods. Although separation of all of the peaks completely may not be possible, the separation may be sufficient to enable the method to work adequately without applying the more complex deconvolution methods. The application of this method and the usage of different materials having simple glow curves noted above may also decrease the importance of the glow curve analysis process Note that a similar approach may be applied with the stimulating light for OSL. The pulses may, however, be of different wavelengths in addition to being of different durations and intensities. Shorter wavelengths have greater energies per photon and thus can selectively clear different traps in materials that have multiple traps.

For OSL materials, it is anticipated that the fading rate will depend upon the energy characteristics of the trap. Similar to the case for TLD impurity traps, an electron captured in an OSL trap more removed in energy from the conduction band (deeper) would require more energy from the stimulating light in order to liberate the electron and create luminescence. Stimulating photons having shorter wavelengths have more energy than photons of longer wavelengths. Thus, an OSL material which has traps corresponding to different energy levels can first be stimulated with a very long wavelength of visible light, thus liberating electrons from the most rapidly fading OSL traps. This can be followed by stimulation with light having a shorter wavelength. This second stimulation would then elicit signal from the next higher energy trap. This process can be repeated for all of the possible traps in the OSL material.

For OSL materials in particular, the stimulated light may be emitted in a spectrum. The emitted light at a given wavelength can correspond to different traps, each of which may fade at a given rate. Analysis of the emitted light spectrum from an OSL, collected using a spectroscopic readout device, would thus yield information about the temporal shape of the dose curve. Instead of stimulating at different wavelengths, it would simply be necessary to collect the emitted light spectrum and analyze this. Integrals under different portions of the spectrum, or peaks at given wavelengths, would serve as the signal, which is most generally described by Equation (1). For different materials emitting light at different wavelengths, data collection can occur simultaneously, thus reducing processing time.

For OSL, TL, and other materials emitting light at a variety of wavelengths following stimulation, the light emission spectra can be fitted with a mathematical function, thereby smoothing out the data. The parameters of this mathematical function can be used to determine the various values of the signals to be used for analysis if the signals from different portions of the light emission spectra were found to exhibit different temporal fading and efficiency functions.

For both OSL and TLD materials, it is noted that when the shallower traps are cleared, electrons may move into them from the deeper traps. This would not cause the above approaches to fail, since corrections for this can be made during calibration of the systems for the actual materials that are to be used. Proper accounting for this phenomenon may be critical for proper operation of the method. This can be done empirically after experimental study of the phenomenon, or based upon theory from the literature.

Self-Equilibrating Detector Concept

Consider the most general situation outlined in Equation (1) above, i.e.

$$R(t_{readout}) = \int_{t_{anneal}}^{t_{readout}} D'(t) F(t_{readout} - t) \varepsilon(t - t_{anneal}) \, dt \qquad (6)$$

where the variables are as defined previously. Because all of the functions in the above equation are continuous, i.e. smoothly varying, the integrated reading will predominantly reflect the dose delivered to the detector during a certain time period immediately prior to readout. This time period will be determined by product of the fading and efficiency rate functions. If this product is a rapidly decreasing function, for example the efficiency function is nearly constant and fading is very swift, then the stored signal will only correspond to recent dose rates.

This is best illustrated by making some simplifications to Equation (6), although it would be true for any continuous functions. Assume that the fading and efficiency function products may be described by a single exponential function. The above equation thus simplifies to:

$$F(t_{readout} - t)\varepsilon(t - t_{anneal}) \approx Ae^{-k(t_{readout}-t)} \qquad (7)$$

$$\therefore R(t_{readout}) = \int_{t_{anneal}}^{t_{readout}} D'(t) Ae^{-k(t_{readout}-t)} \, dt$$

$$R(t_{readout}) = Ae^{-kt_{readout}} \int_{t_{anneal}}^{t_{readout}} D'(t) e^{kt} \, dt$$

If the dose is not considered to change rapidly over the time period of interest, then Equation (7) may be approximated by and solved as:

$$R(t_{readout}) \approx Ae^{-kt_{readout}} \overline{D} \int_{t_{anneal}}^{t_{readout}} e^{kt} \, dt = \qquad (8)$$

$$\frac{Ae^{-kt_{readout}}}{k} \overline{D}(e^{kt_{readout}} - e^{kt_{anneal}})$$

$$R(t_{readout}) \approx \frac{A}{k} \overline{D}[1 - e^{-k(t_{readout}-t_{anneal})}]$$

Note that as the difference between the annealing and readout times becomes large with respect to the exponential signal fading function, the second term in the brackets approaches zero. In mathematical terms, this means:

$$\lim_{k(t_{readout}-t_{anneal})\to\infty} R(t_{readout}) \approx \frac{A}{k} \times \overline{D} \qquad (9)$$

It should be noted that the expression for the signal at the time of readout for lapsed times long relative to the fading constants, as shown in Equation (9), is independent of the time between the initial zeroing of the detector signal and the readout process. This reduces any errors due to variations in the measurements times. This also eliminates the importance of zeroing a detector carrying negligible signal immediately prior to deployment (detectors annealed at readout time which are protected from high exposures will approach the above reading under conditions of normal exposure). Note that a result of the relation is that only exposures a restricted time frame prior to readout is important for short signal fading half-lives.

In other words, if the fading is rapid enough relative to the time of deployment of the detector, then the signal stored on the detector will only reflect the dose delivered during the immediately prior period. As stated previously, although the above assumed a simple exponentially decaying function, this would also be true for more complex fading and efficiency functions. The usage of dosimetric materials that fade thus eliminates the need for extensive annealing procedures in the field.

FIG. 11 illustrates the equilibration mathematics for the simplified example, with arbitrary units chosen. The independent variable is the time (B), while the dependent variable (A) is the signal being stored on the dosimeter at any given time. The upper, solid line (C) represents the signal in a detector with rapid fading characteristics, while the lower, dashed line (D) represents the signal in a detector with less rapid fading characteristics. For simplification and comparison purposes, the signals stored in the two different peaks or materials are normalized with their relative sensitivities. For this example, the dose rate begins at a level corresponding to a maximum signal of 100 (E), where it stays until time t=40 (H). From 40 (H)$\leq$t$\leq$60 (I), the dose rate is such that is corresponds to a maximum signal of 150 (F). After that time period, the dose rate is lowered to match a maximum stored signal of 90 (G) until t=80 (K). During the final period shown on this curve, the dose rate is adjusted so that the maximum corresponding stored signal is equal to 40 (J). For this example the upper curve (C) corresponds to a material that has a fading constant which is 20 times faster than material whose stored signal is represented by the lower curve (D). It is clear that the more rapidly fading material is quicker to adapt in order to reflect the current dose rate. The material that is more slowly fading fails to reach equilibrium quickly. The more rapidly fading material under-represents the dose rate when the dose rate is increasing, and over-represents it when the dose is decreasing.

It is noted that the same basic principles will be operating for more complex fading and efficiency functions. In addition, ratios of values for materials or signal peaks that fade at different rates may be used in combination with a self-equilibration method.

The amount of signal being stored on a given dosimeter is actually a rather complex mixture of contributions from doses that have been applied during different time periods. Considering discrete time periods over which some average dose is to be estimated. A unique method of determining the dose as a function of time relies upon making assumptions about the time period for which the dose is important for dosimeters equilibrating at different rates. For simplicity, neglect the efficiency temporal variations during these discrete time intervals, i.e. assume that some average value, '$\varepsilon$', of the efficiency would apply over the time interval. Also assume that fading is a simple exponential function, which is characterized by:

$$F(t) = e^{-k_x t} \qquad (10)$$

Note that the signal will re-equilibrate at the same rate 'k' as the fading constant.

The stored signal 'S' for material 'x' at a time '$t_m$' between times '$t_0$' and '$t_M$', for which the dose rate is '$D_i$' and the dosimeter was annealed (i.e. the signal cleared) at time '$t_0$' would be given by:

for $D(t_0)=0$, $t_o < t_m < t_M$, and $D(t) = D_i$ $$S_x(t_m) = \epsilon D_i [1 - e^{-k_x(t_m - t_o)}] \quad (11)$$

If at time '$t_M$' the dose rate changes to '$D_j$', where it remains until time '$t_N$', then the stored signal becomes:

for $t_M < t_n < t_N$, and $D(t_n) = D_j$ $$S_x(t_n) = \epsilon D_j [1 - e^{-k_x(t_n - tM)}] + \epsilon D_i e^{-k_x(t_n - tM)} \quad (12)$$

Another change at time '$t_P$' to a dose rate of '$D_k$' results in a stored signal of:

for $t_N < t_p < t_P$, and $D(t_p) = D_k$ $$S_x(t_p) = \epsilon D_k [1 - e^{-k_x(t_p - tN)}] + \epsilon D_j e^{-k_x(t_p - tN)} + \epsilon D_i e^{-k_x(t_p - tM)} \quad (13)$$

This may be re-written as:

$$S_x(t_p) = \epsilon D_k [1 - e^{-k_x(t_p - tN)}] + \epsilon e^{-k_x(t_p)} [D_j e^{-k_x(-tN)} + D_i e^{-k_x(-tM)}]$$

$$\therefore S_x(t_p) = \epsilon D_k - \epsilon e^{-k_x t_p} [(D_k - D_j) e^{k_x tN} - D_i e^{k_x t_M}] \quad (14)$$

The general mathematical form of the equation describing the stored signal remains similar to those of Equation (11), Equation (12) and Equation (13) as time progresses, but whenever the dose changes an additional term is added. This term represents the equilibration to the signal corresponding to the new dose, while the other terms represent the fading of the signal due to the prior dose level.

As the time since the change in dose rate increases, the greater the dominance of the first term in Equation (14) (due to the most recent dose rate) will be. The rate constant 'k' dictates the degree to which the first term dominates. The times between the other doses will dictate the relative contributions of the other doses to the signal. In addition, the relative values of the dose in the various integrals will play a role in the dominance of that dose for a given peak. It is noted that equations similar to the above can be written for other fading and temporal efficiency functions.

The rate constants are known for each peak. Suppose that, say, 90% the stored signal for the most slowly fading peak '1', which has a signal '$S_1$' corresponding to an estimated dose '$D_1$', has originated from a time '$t_1$' before the readout time '$t_{readout}$'.

If this peak were not expected to fade appreciably over the time period of interest (the difference between the annealing and readout times), then '$t_1$' would equal the time of annealing. Similarly, suppose that 90% the stored signal for a given peak '2' has originated from a time '$t_2$' before the readout time '$t_{readout}$'. In general, suppose that 90% the stored signal for a given peak 'x' has originated from a time '$t_x$' before the readout time '$t_{readout}$'. The dose for the time interval ($t_1 \Rightarrow t_2$) would be given by ($D_1 - D_2$). Similarly the dose for the time interval ($t_2 \Rightarrow t_3$) would be given by ($D_2 - D_3$). In general, the dose for the time interval ($t_x \Rightarrow t_{x+1}$) would be given by ($D_x - D_{x+1}$).

An initial assumption that the dose is constant throughout the deployment period can form the basis of initial guesses for the doses in each time period. Then, these doses can be used in conjunction with equations in the form of the above equations, namely Equation (11), Equation (12), Equation (13), and equations that follow from these with altered form from Equation (13) each time there is a subsequent change in the dose rate, to determine the appropriate times for which each peak signal received the bulk of its signal, say 90%. Zero stored signal can be assumed initially in the case of annealing, or a signal that corresponds to an equilibrium with background can be assumed for the case in which annealing is not possible. The appropriate times for which this is true can then be determined from the above equations. The guesses concerning each of the doses can then be updated using these times.

The process is then repeated until convergence upon a given set of doses and times is obtained. The iterative process can cycle around either the doses or the times (which are dependent upon the doses) to reach equilibrium. Solutions can also be constrained by constraining the differences in doses from one interval to the next, or by limiting the range of times that dominate for a given peak.

Tamper Detection and Corrections for Environmental Conditions

Both TL and OSL radiation detectors can be incorporated into a radiation detection system. The combination would strengthen the performance of the system providing a mechanism for detecting tampering. TL materials lose their signal at more rapid rates at higher temperatures and are not as sensitive to light, whereas OSL materials tend to lose their signals as a result of exposure to light and are not as sensitive to temperature variations. If the signal received in TL materials indicates a different dose than the dose predicted by the measured OSL signal, then there are several possibilities. The TL material can have been subjected to a higher or lower temperature than expected, or the OSL material was subjected to light at intensities and wavelengths that would cause a decrease (or increase) in its signal through a readout process. Increases or decreases in signal can also occur in materials that accumulate or lose signal as a result of exposure to ultraviolet or infrared light.

Suppose that an individual attempted to tamper with the radiation detector by heating it to clear out the TL signal. This would lower the stored signal in the TLD, but not have such a great effect on the OSL detector. The OSL detector would indicate a much higher dose than the TLD, which raises a flag as suspicious. Alternatively if the OSL detector indicates a much lower dose than the TLD, then an attempt can have been made to anneal the stored signal by exposing the radiation detector to light, which would not have affected the TL signal in the same way.

Suppose that '$P(I, \lambda, T, h)$' represents the fractional alteration in the stored OSL or TL signal under different conditions of temperature 'T' and humidity 'h' for exposure to light of wavelength '$\lambda$' and intensity 'I'. It is expected that 'P' would only be a weak function of 'I', '$\lambda$' and 'h' for TLDs. For OSL materials, it is expected that 'P' would be a strong function of 'I' and '$\lambda$', a weaker function of 'T', and a very weak function of 'h'.

The function 'P' is known, as it can be determined experimentally for any given TL or OSL material and/or OSL or TL peak. 'P' can be fit with a mathematical function to simplify its usage, but that mathematical function might have different shapes for TL materials compared to OSL materials. Parameters (as well as best fit functional shapes) would also vary for different TL and different OSL materials and traps. For example, a TL material having only rapidly fading, shallow traps would be much more sensitive to alterations in ambient temperature than one with deeper traps which require more energy to liberate the trapped electrons into the valence band. If the best fit function were a single exponential, the fading parameter in the exponential would be much larger for the rapidly fading trap than for the fading trap, and the function 'P' would be a much stronger function of temperature.

Assume that the function 'P' includes any required normalization when it is integrated over the entire spectrum of stimulating light wavelengths ranging from '$X_{minimum}$' to '$X_{maximum}$'. Incorporating the environmental dependencies of the material response into the equation describing the resulting signal obtained during readout of the detector following an elapsed time of ($t_{readout}$–$t_{anneal}$) following the annealing time (initial deployment), one obtains the following:

$$R_i(t_{readout}) = \int_{t_{anneal}}^{t_{readout}} D'(t) F_i(t_{readout} - t) \qquad (15)$$
$$\varepsilon_i(t - t_{anneal}) \left\{ \int_{\lambda_{minimum}}^{\lambda_{maximum}} P_i[I(t), \lambda_l(t), T(t), h(t)] d l \right\} dt$$

Tampering would consist in altering the values of 'I', 'λ', 'T', and 'h'. Such alterations can cause instabilities in the solution of the set of equations defined by Equation (15) for the dose rate as a function of time, "D'(t)". Lack of a stable solution to the equations may raise suspicion, based upon experience with the overall method, and can form the basis for further inspection of the cargo.

If the dose is assumed to be constant (invariant) as a function of time, then Equation (15) becomes:

$$R_i(t_{readout}) = \overline{D} \int_{t_{anneal}}^{t_{readout}} F_i(t_{readout} - t) \qquad (16)$$
$$\varepsilon_i(t - t_{anneal}) \left\{ \int_{\lambda_{minimum}}^{\lambda_{maximum}} P_i[I(t), \lambda_l(t), T(t), h(t)] d l \right\} dt$$

Rearranging Equation (16) gives the following:

$$C = \frac{1}{\overline{D}} = \frac{1}{R_i(t_{readout})} \int_{t_{anneal}}^{t_{readout}} F_i(t_{readout} - t) \qquad (17)$$
$$\varepsilon_i(t - t_{anneal}) \left\{ \int_{\lambda_{minimum}}^{\lambda_{maximum}} P_i[I(t), \lambda_l(t), T(t), h(t)] d l \right\} dt$$

One equation of the above form exists for each material and/or trap within the material, and these equations are all equal to the same numerical constant 'C', i.e. to each other. The forms of the equations that describe the functions 'F', 'ε', and 'P' are known, as are the values of '$t_{readout}$' and '$t_{anneal}$' for a given dosimeter deployment. The signal 'R' is measured for each material or trap within the material. If enough different peaks, or values of 'i', were available for measurement, then 'C' can be determined and 'I', 'λ', 'T', and 'h' can be solved over distinct time frames. Alternatively, significant differences in predicted values of the constant 'C' for the different materials and/or traps with given know values of the environmental parameters can serve to flag tampering.

The problem would be substantially simplified if the dependency of 'P' on 'h' were neglected. Furthermore, if only temperature is considered to vary as a function of time, then Equation (17) reduced to:

$$C = \frac{1}{R_i(t_{readout})} \int_{t_{anneal}}^{t_{readout}} F_i(t_{readout} - t) \varepsilon_i(t - t_{anneal}) P_i[T(t)] dt \qquad (18)$$

The set of equations of the form of Equation (3.4) can thus be readily solved for 'T(t)', and variations from expected values of 'T(t)' can be flagged as tampering attempts.

The actual values of the temperature as a function of time, 'T(t)', can be measured, either on the shipping vessel or using a monitor integral or attached to the shipping container itself. If the temporal temperature function 'T(t)' is known, then the function 'P[T(t)]' can simply be utilized as a correction to Equation (15), resulting in better results for determining the dose as a function of time. In other words, using the known temperature as a function of time data, a correction can simply be carried out for the detector response. This improvement would then enable a comparison of the values of 'C' predicted by each of the materials or traps within a given material. Variations in 'C' can thus serve as an even better possible flag for unusual radiation or tampering. Alternatively, the solution for the dose as a function of time, 'D(t)' using Equation (15) can be made more stable and accurate.

Similar processing to the above can be accomplished by assuming that the temperature is known or unimportant, and focusing on the variation in the extraneous light intensity 'I' and wavelength 'λ'. In other words, 'I' and 'λ' can be predicted as functions of time for the data, and unusual variations flagged. Alternatively, known values of intensity 'I' and wavelength 'λ' can be used to correct the signals from each material and/or peak. If a constant dose is assumed over the deployment time, then variations in predictions of this dose can also be a cause for suspecting tampering.

By way of a partial summary of the above, if the responses to conditions of temperature and light exposure to TL and OSL based radiation detectors are well characterized, then an empirical function may be used to correct for these. Also, both OSL and TL dosimeters should both read the same dose. If they do not, it can be because of unusual light and heat exposures. Correction can be made for extreme conditions. Alternatively, differences can indicate tampering, resulting in flagging of the container. If the relationship between the different signal peaks is known under different conditions of temperature (or light exposure) for TLDs (or OSL materials) then these relationships can be used to actually determine environmental conditions if the dose is assumed to be constant as a function of time. The environmental conditions of interest can be monitored in the vicinity of the radiation detector, which would assist in performing corrections and possibly discovering attempted tampering since unexpected extremes in light exposure or temperature may be the result of such tampering.

Packaging around the dosimeters can also be made to minimize environmental effects (using insulation against heat or of a light-tight nature). Contact with the reader or read-out mechanism can also be designed such that the OSL and TL materials are not subjected to variable conditions or extreme elements during the read-out process.

If a material is exposed to background radiation and undergoes signal fading at the same time at an appropriate rate, then for a long enough wait time at a constant background radiation rate and temperature the signal held on the dosimeter will reach an equilibrium value. Both heat and light may be involved in these processes. This was discussed previously in the section on self-equilibrating dosimetry. Deviation from an expected equilibration value can either indicate a variation in ambient radiation or a change in the surrounding environmental conditions. If a dosimeter material is pre-dosed with a known amount of radiation which is larger than expected ambient background, then the signal that should be read out at the end of the deployment period can be readily predicted from the material properties and assumptions about the environmental conditions. A deviation from this value will indicate that either extreme environmental conditions or tampering have occurred. In the case of much higher than expected values in the readout for the pre-dosed material, a deviation from what is expected can also indicate exposure to a large, suspicious amount of radiation. In any event, inclusion of a heavily pre-dosed dosimeter element in the detector can serve as a monitor for extreme environmental conditions. In fact, from the deviation of the measured and expected responses the temperature and/or light exposure can be estimated, which will then enable the empirical corrections discussed above. One or more pre-dosed dosimeters can thus also serve as a tamper detection mechanism.

In lieu of pre-exposing a dosimeter to a known amount of radiation, a longer-lived radiation emitting radionuclide can be mixed with or held adjacent to one or more dosimeters that are part of the detection system. It would be preferable to use radionuclides that emit primarily non-penetrating radiation such as alpha and beta particles, so that other portions of the radiation detection system would not be affected. The continuous exposure of the dosimeter to radiation would cause a buildup in stored signal that would equilibrate to a known amount based on the known fading properties of the material. The actual accumulated signal, however, would be affected by the environmental conditions. Variations in the measured signal from that predicted for normal environmental conditions can be used to flag tampering or to extrapolate information about the environmental conditions in order to perform empirical corrections to readings from other portions of the detection system not affected by the known radionuclide presence.

For materials that fade when exposed to light, there will be an equilibration between the signal received from the exposure to the light, and the induced signal fading. OSL materials can thus be pre-dosed and allowed to equilibrate with ambient conditions If properly characterized, it is possible that this function can be used to allow materials to be used without having to maintain them in light tight or heavily insulated enclosures. This is akin to using the self-equilibration properties of materials or signal peaks that have significant fading rates, discussed in a previous section, to lessen the effect of environmental conditions.

An ultraviolet (UV) or infrared (IR) sensitive material or detector can be incorporated into the system. This can be used to determine the total UV or IR exposure for use as a correction to the dosimeter readings.

Concealability of Detectors

If the detection system is concealed, tampering with it will be made more difficult. This can be accomplished by applying the dosimeter material in the form of paint and appropriately designing a readout system for this.

The dosimeter can also have the form of a fine powder, which can subsequently be collected or vacuumed out for analysis. The powder can be within the shipping container, or with the shipping papers. The shipping papers or protective cover for the shipping papers can have the dosimetric material directly incorporated into them.

Usage of a very small amount of dosimeter material or a tiny detector may be possible because of the high sensitivity of the radiation detection approach that is enabled by its time-integrating nature. This system may be made so small that it can be placed with the shipping papers. A single dosimeter can also be concealed on or within the container, or made part of a monitoring package that is designed to discourage tampering and can also include detection devices for chemical and biological hazards.

For the forensic monitoring of individuals, tiny detectors can be surreptitiously attached to a suspect's article of clothing or other personal belonging, or hidden in vehicles or homes. These can be retrieved later or made into self-monitoring units that transmit the data remotely. A paint or powder can also be applied to the individual's possessions or placed in such a way that the individual picks up the substance on their skin, clothing, vehicle, or other personal possession that can then be analyzed at a later time. By correlating information from the dosimeter with knowledge of the person's movements or whereabouts, one can determine where a source of radiation was or currently is located.

Determination Of Radiation Type and Energy, and Identification of Radiation Source Dose is the amount of energy deposited per unit mass in an object. In organisms, dose correlates to biological effect. Knowledge about the type and energy of radiation is critical for determining the actual dose to individuals being exposed to the radiation. For example, alphas external to the body will typically expose only the external dead layer of the skin, and thus have little biological effect. They may, however, result in the deposition of dose if they come in direct contact with a dosimeter.

Beta radiation having energy greater than a certain amount will cause exposure to sensitive layers of the skin, but not to organs deeper in the body unless the source is ingested, inhaled, or otherwise taken into the body. This skin dose is sometimes called shallow dose.

Gamma rays and x-rays (photons) penetrate tissue to varying degrees, depending upon their energy. The dose at 1 cm within a tissue is often referred to as deep dose.

Neutrons may produce both deep and shallow dose. More importantly, the biological effect per amount of absorbed energy for neutrons is larger than those of alphas, betas, and photons. This means that their contribution to dose must be distinguished from the contributions of other radiation. Since the relative degree of biological damage produced by neutrons is a function of their energy, knowledge of neutron energy is important.

In order to determine the type and energy of radiation that produces dose, traditional radiation dosimeters are placed in a dosimeter holder or "badge" that has a variety of filters surrounding the dosimeters. In addition, the holder may contain different types of dosimeters having different relative sensitivities to different radiation types.

For example, a badge may hold four dosimeter elements. One element can have no material shielding it, and thus be sensitive to all types of radiation (alphas, betas, photons, and neutrons). If this element were made sufficiently thin, then it would have diminished capability of detecting the more penetrating gamma and neutron radiation, and would thus be preferentially sensitive to alphas and betas as these will be completely stopped (and thus deposit the bulk of their kinetic energy) in the dosimeter. A thicker element can be placed behind a thin sheet of plastic or other lower density material. If this thick plastic shield or 'filter' is thick enough to completely absorb any alpha and beta radiation before it reached the dosimeter element, then the dosimeter would only measure dose due to x-rays, photons and neutrons. Copper and aluminum filters have also been used in this manner. The usage of the different filters helps distinguish the energy of the incident beams.

Finally, one element within the badge can be made of a material that is preferentially sensitive to neutrons. An example of this would be the use of lithium-6 enriched lithium fluoride, as compared to naturally occurring lithium that has a greater amount of lithium-7. Lithium-6 has strong interaction characteristics with neutrons, and the enriched lithium fluoride would thus have a markedly stronger signal than the natural lithium in a neutron field. Differences in lithium 6 and 7 signals would thus signify a neutron source.

A given design of dosimeter badge typically will not have more than four different elements. In the simplest case, for example a field that is known to consist only of betas and photons, the amount of deep and shallow dose may be determined directly if the design of the badge is appropriate. Ideally for example, the signal in a dosimeter that effectively has no filter in front of it, i.e. a bare dosimeter, would correspond to the sum of the photon and beta doses while a filtered dosimeter would have only the photon doses. The beta dose could thus be determined by subtracting the doses determined for each of the dosimeters. In reality, the situation is more complicated.

Empirical equations are derived to determine the deep dose, shallow dose, and neutron dose. These algorithms (as referred to by dosimetry practitioners) will typically use values of the signal from each element, or ratios of these signals. A decision tree is often implemented. For example, if the ratio of the signals from two elements is larger than some number, then the deep dose is computed using a formula that may contain one or more values of the signal from a variety of elements that were included in the badge.

The filtered approach has been limited in application to distinguishing deep dose, shallow dose, and neutron dose from each other and determining the values of these doses. For homeland security and other applications, it would be desirable to know more precisely not only the type of the radiation but its energy. Such information would be useful in identifying the radionuclide that led to the dose. Knowing the radionuclide would allow a radiation detector to distinguish naturally occurring radiation from illicit radiation, even in the presence of shielding. The present teachings provide methods by which radiation source identification can be accomplished using passive integrating dosimetric materials. Effectively, the methods of the present teachings allow spectroscopic measurements of radiation fields without the need for the complex electronics and processing that is currently required to elicit such information. These approaches are not limited to OSL and TL, but work for any radiation detector type.

In one implementation, wedges or multiple steps of different materials and/or of different thicknesses are used to filter radiation reaching either strips or individual elements of detector material. Consider one illustrative example shown as FIG. 12. In FIG. 12, radiation A strikes a filter (or set of filters) B. The filter B consists of portions having different thicknesses, say C, D, E, F, G. Some of the radiation A will pass through the filter unstopped (not interacted or attenuated) where it will be able to deliver dose to the detector element N. Other radiation will interact and lose a portion of its energy before delivering dose to the detector element N. Various fractions of the energy incident on detector element N will be absorbed, depending upon the energy of the incident radiation and the material and thickness of the detector element N.

The detector element N in FIG. 12 may contain distinct detectors, such as H, I, J, K, and L. These detectors will measure different doses because different numbers of photons are reaching them due to the variable thickness of the filter B. For example, H will receive a higher dose than I, which will receiver a higher dose than J, which will receive a higher dose than K, which will receive a higher dose than L. Note that the filter B may also be a continuous wedge or ramp, consist of several different ramps, or consist of regions of different materials having different attenuation properties. In addition, the detector module N may have a single, positionally sensitive detector instead of distinct detector elements. Such a long detector can also be read out. Different combinations of filter and detector geometries, materials, and designs are possible. Copper, aluminum, lead, and tungsten are particularly good materials to use for filtration.

Figure 13C:
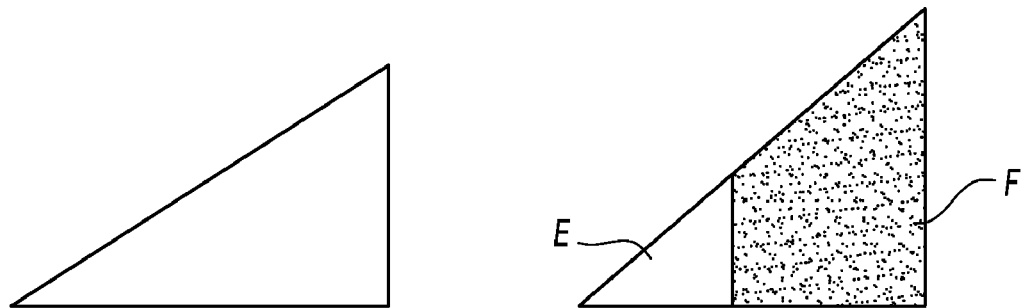
Figure 13C:
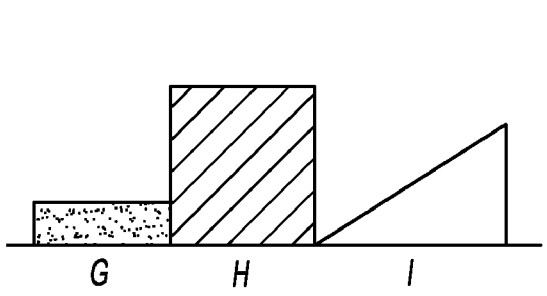
Figure 13D:
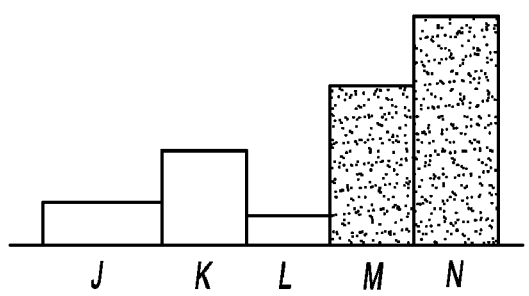
Figure 14A:
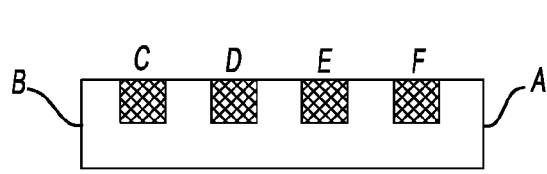
Figure 14B:
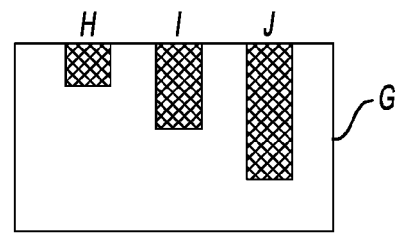
Figure 14C:
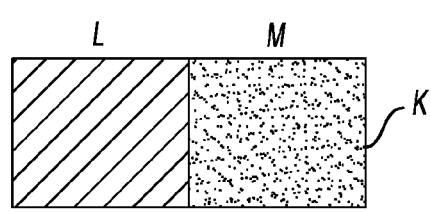
Figure 14D:
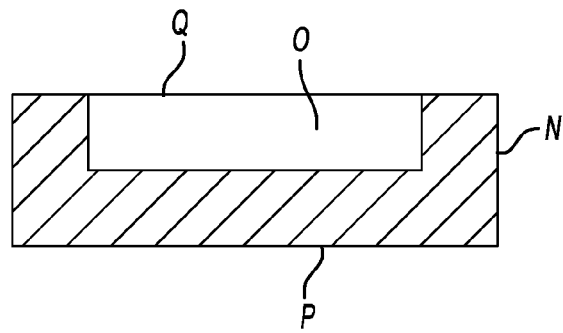

FIG. 13 shows several different example filter designs. A is a single ramp filter of a single material. B is a continuous ramp filter consisting of two materials, E and F. C is a filter that has a combination of material types and configurations. It includes a thin filter portion of material G, a thicker portion of material H, and a wedge of material J. There are many other possibilities for filters.

FIG. 14 shows some example detector designs. Detector A has distinct detector elements C, D, E, and F, separated by a matrix B. The matrix assists in preventing scattered radiation from within the detector module from complicating signal within each detector element. Detector G has detector elements H, I, and J of different thicknesses. Such might be highly desirable if it were desired to make the detectors more sensitive for portions of the filter for which fewer photons would be penetrating. More sensitive detector materials can also be used in the filter design itself. Detector K in FIG. 13 shows a detector module of uniform thickness but using two different detector materials, for example L and M. In this case, M can be neutron sensitive, and M neutron insensitive. Detector module N in FIG. 14 shows the basic detector O surrounded by a shield P that prevents the interaction of radiation coming from directions other than Q in the detector O. This gives the detector module some positional sensitivity, thus preventing interference of radiation that has not passed through the filtration system to contribute to the signal in the detectors.

Note that there are many combinations of continuous detector elements, distinct detector elements, different detector thicknesses, and different detector materials that can be considered in order to optimize a design. Reflective materials (moderators) for neutrons and photons, or absorptive filters can also be placed around or on the back of the filter detector system in order to enhance or reduce the response in particular regions to particular types of radiation.

For example, shielding the sides and back of the detector module from radiation would make the system more directionally specific. This is illustrated in FIG. 14 in which the continuous, uniform thickness detector O is surrounded by a photon absorptive material P on all sides except for its front face Q. With such an arrangement, only photons coming from a direction that allows them to directly enter the system through Q will result in signal in the dosimeter. Each individual detector element in a detection system that has multiple, distinct elements, can be shielded from others by such materials. This would also reduce cross-talk in recorded signals as a function of position that would be caused by radiation scattering in the filter system.

Surrounding a portion of the detector in neutron moderating material would increase its sensitivity to fast neutrons. The detector and filter systems can also be designed in a manner similar to albedo dosimeters. Adding material with a high thermal (lower energy) neutron absorption cross section within the detector or in locations around the system can further cause a positional increase in response at a known location which would correspond to thermal neutrons.

The detector may be designed to be a set of individual detectors, be read out a bit at a time, or be read out all at once with the light being projected closely to a photodiode or other light sensing array. The intensity recorded as a function of position represents an attenuation curve, which will be reflective of the radiation spectra. This information is used to help distinguish between background, benign radionuclides and unusual radionuclides and irradiation conditions. A combination of filters and detector types can be used to enhance the differences in the signal read for different radiation fields. The average energy of the field can also be computed by a variety of evident means. A library of signals can be used to flag suspicious energy information.

The use of different materials in the filtration system would have some distinct advantages because of the absorption characteristics of materials as a function of photon energy. Photons below a certain energy, which is the case for most photons of interest for these applications, primarily undergo Compton scattering interactions and photoelectric absorptions. Compton scattering interactions involve the loss of energy and change in direction of the scattered photon with some local energy deposition, or delivery of dose. The photoelectric effect involves the complete absorption of the photon. This is usually accompanied by the emission of a lower energy X-ray whose energy is characteristic of the material in which the incident photon was interacting. At photon energies above 1.02 MeV, the photons may undergo pair production, which results in the complete absorption of the photon and the emission of an electron positron pair. The probability of the different types of interactions as a function of energy is shown in FIG. 15 for water and FIG. 16 for lead.

As shown in FIG. 15, the total probability of interaction of a photon with water, A, decreases with increasing incident photon energy. The probability of photoelectric interactions, D, dominates over an energy region E, whereas the probability of Compton scattering in C is largest over an intermediate energy range F. At very high energies, the probability of pair production B becomes non-zero. This is more probable than other interaction types in a very high energy range G.

The situation is very similar for the probability of interaction of a photon in lead, A', which is shown as a function of energy in FIG. 16. The probability of photoelectric interactions, D', dominates over an energy region E', whereas the probability of Compton scattering is C' is largest over an intermediate energy range F'. At very high energies, the probability of pair production B' becomes non-zero. This is more probable than other interaction types in a very high energy range G'.

Note that the overall probabilities of interaction are larger for lead than for water, so the total thickness of materials needed to stop radiation in a filter will be smaller for lead than for water. In addition, smaller differences in thickness will result in larger changes in absorption when lead is used. This is true for nearly all materials, with higher atomic number and higher density materials being more effective at attenuating photons. When the atomic number of the filter material is high enough, peaks in the probability of photoelectric effect will be noticeable at energies corresponding to atomic energy levels. In FIG. 16, these are apparent and indicated as H and I. Because these occur at different energy levels for different materials, the attenuation as a function of energy curves are very distinct. A careful choice of materials would thus result in more distinct absorption as a function of thickness and incident photon energy. The larger these differences are, the more precise this proposed method of energy discrimination.

The method of spectroscopic radiation detection using filtration is illustrated in FIG. 17. Here, a wedge filter A of a single material is used with a continuous radiation detector system B, with monoenergetic incident radiation G. For a material of relatively low atomic number, the dose will decrease as a function of position in rough accordance with the decreasing exponential curve C. The actual curve C is complex because of the occurrence of scattering in the beam and the fact that in reality incident radiation is never truly monoenergetic.

If a filter material is selected such that prominent peaks (such as I in FIG. 16) occur in the photoelectric absorption probability as a function of energy, then the shape of the dose deposited as a function of position in the detector will be altered such as that shown as D in FIG. 17. If the peak in absorption in the filter materials occurs at an energy E in FIG. 17, then there will be a slightly decreased number of photons reaching the detector at that point. The detector material itself will also exhibit these properties. For example, if the detector material is such that there is a peak in the photoelectric absorption curve at energy equal to H in FIG. 17, then the detector material at that position will be slightly more efficient at absorbing photons of that energy. In such a case, a peak I may be apparent in dose versus position curve, as shown by G.

The situation involving the filters and dose as a function of detector position, or position within a continuous detector, may be expressed mathematically. This situation is illustrated in FIG. 18. Here radiation A is incident on filter B. The number of photons of a given energy that is incident upon the filter, or incident energy spectra, is illustrated as F. When these photons pass through the filter B, they lose energy. The total amount of energy lost depends upon the density of the filter material, the type (atomic number) of the filter material, and the thickness of the filter material. For non-uniform filters as a function of position 'x', the photons emerging from the Filter, C, will have different spectra G as a function of position in the x direction. The detector D will absorb radiation, or accumulate dose that translates into signal, depending upon its composition (atomic number), thickness, density, and the energy of the photons incident upon it.

Thus the dose will vary as a function of position, following some pattern H in FIG. 18. This pattern H will be characteristic of the incident energy spectra F. The relationship of H to F will be determined by the designs of the filter B and detection system D, as well as on the incident photon energies F. The dose as a function of energy H, however, should be characteristic of F. when the detector is read out, the result with be a signal 'I' that varies as a function of position 'x'. The relationship between h and 'I' will be determined by the sensitivity of the readout system.

Let '$N_o(E)$' represent the number of incident photons having energy 'E', i.e. the incident radiation spectrum. Let '$N_f(E, x)$' represent the number of incident photons having energy 'E' emerging from the filter at position 'x', i.e. the emerging radiation spectrum. Let the function that describes the relationship between the radiation spectrum entering the filter '$N_o(E)$' and the radiation spectrum leaving the filter '$N_f(E, x)$' is denoted 'B'. 'B' will vary with the energy and will produce different numbers of photons with differing energies following the interactions in the filter. Use 'D(x)' be used to denote the total dose delivered to the detector 'D' at position 'x'. The relationship between the dose and the incident photon energy can be complex, but will be denoted here as 'G(E)'. Let '$\epsilon$' represent the efficiency of the detection system, i.e. the ratio of the signal intensity to the dose.

For a detector of uniform composition, density, and thickness, 'ε' should be spatially invariant except near the edges of the detector. However, if the detector is designed with different materials, densities, or thicknesses as a function of position, then the efficiency will be spatially variant. Note that the efficiency will be different for different traps within the OSL or TL material because of the number of available traps and other inherent material properties.

For most incident radiation energies and dose levels, the relationship between the dose and the resulting signal intensity upon readout is strictly linear, i.e. the efficiency is not a function of dose or the energy of the radiation producing the dose. At very high doses, however, there may be deviations from this linearity because of saturation of the material traps. This may also be true in cases for which the linearity between signal and dose is disrupted at low doses. For example, this might occur as a result of recombination processes. For such cases the efficiency may be denoted 'ε(D)'.

There has been some speculation that there may be slightly different efficiencies for the different trapping levels depending upon the incident photon energy that produced the dose. In such a case the efficiency will be a function of energy, and would be best denoted 'ε(E)'. If this is the case, then the signals from different traps may vary with the energy of the incident photons, and the differences in these can be used as a method for energy discrimination. To account for both nonlinearities due to dose and energy, an appropriate designation for efficiency would be 'ε(D, E)'.

The mathematical treatment of this situation follows. Note that the functions 'B', 'G', and 'ε' in Equation (19) below contain any necessary factors needed to normalize the integrals. Consider the photons incident upon the filter to range in energy from a value of zero to '$E_{maximum\ incident}$'. The number of photons of energy '$E_j$' emerging from the filter at position 'x' will be given by:

$$N_f(E_j, x) = \int_0^{E_{maximum\ incident}} N_o(E_i) \times B(E_i, E_j) dE_i \quad (19)$$

The spectral transmission function 'B' depends upon filter design, specifically its thickness, atomic number, and density. Note that the spectrum emerging from the filter is also the spectrum incident upon the detector. The energy of photons emerging from the filter will be less than or equal to the energy of the photons incident on the filter. Thus the maximum energy of the photons emerging from the filter will be '$E_{maximum\ incident}$'.

The dose delivered to the dosimeter or detector at position 'x' due to the photons that emerged from the filter is thus given by:

$$D(x) = \int_0^{E_{maximum\ incident}} N_f(E_j, x) \times G(E_j) dE_j \quad (20)$$

Note that the above can be applied to a continuous detector, or to a detector for which separated detector elements are used. The function 'G' depends upon the dosimeter or detector design, specifically its thickness, atomic number, and density.

The signal at any given location is thus described by:

$$S(x) = \int_0^{E_{maximum\ incident}} D(x) \times \varepsilon[D(x), E_k] dE_k \quad (21)$$

In many cases, because the readout process is generally linear with dose and if the efficiency of the readout system is not a function of the energy of the radiation that produced the dose, the Equation (21) reduces to:

$$S(x) = \varepsilon \int_0^{E_{maximum\ incident}} D(x) dE_k \quad (22)$$

Combining the above equations for the most general case, the signal at any given location is thus described by:

$$S(x) = \quad (23)$$
$$\int_0^{E_{maximum\ incident}} \left\{ \int_0^{E_{maximum\ incident}} \left[ \int_0^{E_{maximum\ incident}} N_o(E_i) \times B(E_i, E_j) dE_i \right] \times G(E_j) dE_j \right\} \times \varepsilon[D(x), E_k] dE_k$$

If the situation is mathematically or experimentally discretized, i.e. broken into distinct ranges of values of 'x', then one value of 'S(x)' will result for each distinct positional range of the detector. The functions 'B', 'G', and 'ε' can be determined experimentally or using simulation programs, such as the radiation transport simulation computer programs Monte Carlo Neutron-Particle (MCNP) or Electron Gamma Shower (EGS). One equation of the form of Equation (23) would result for each distinct positional region of the detector. These would comprise a set of equations, in which 'S(x)' is measured, the functions 'B' and 'G' are known, and the incident radiation spectrum '$N_o(E_i)$', which was denoted as F in FIG. 18, is unknown.

The equations can be solved numerically or through matrix inversion processes. The solution processes can be similar to those discussed above for temporal dose determination. Alternatively, an algorithmic approach similar to that being used in practice to distinguish deep and shallow dose can be implemented, except that a larger number of signals would be available, and the output would include the type and energy of the radiation. The identification of the radiation source itself, whether this is a specific radionuclide or a particular energy from a radiation producing device, can also be the direct result of the application of a decision-tree-like algorithm based upon the increased amount of data arising from the specially designed filtered system.

Note that filters may be designed as three dimensional objects, and detectors may similarly operate in two or three dimensions. For a three dimensional filter, different filter materials or thicknesses can be placed in the dimension that comes out of the page of the diagrams shown in this disclosure. A detection system that is positionally sensitive in two dimensions can be used to obtain the desired information. For three dimensional detector operations, the light emitted as a function of depth in the detector, or from distinct detectors placed at varying distances in a stacked fashion contains additional information about radiation spectra that can be exploited in the method.

Instead of computing the incident energy spectra, an average energy of the incident spectra can be computed through a simplification of the above equations. Deviations of this from the average energy expected for background can be used to flag cargo for additional inspection. The average observed energy can also provide some limited information about the radionuclide or type of illicit radiation present.

As another alternative to computing the incident energy spectra or average energy, the resulting positionally variant pattern of signal in the detector (either in one, two, or three dimensions) can be compared with patterns held in a library. This library can contain patterns corresponding to normal background in the area in which the detectors are deployed, such as along a given shipping route. Alternatively or in addition to this, positional patterns corresponding to specific radionuclides can be included for comparison.

This process is illustrated in FIG. 19. The expected background signal as a function of time is represented by A. Because the magnitude and shape of the measured signal as a function of time, B, agrees closely with the expected pattern A, no illicit radiation is expected. For the measured signal as a function of time in another situation, represented by C, a peak D exists in the pattern that is not present in A. This is suspicious and possibly indicates the presence of a radionuclide that emits a higher energy photon that should not be present and might be intended for use in an RDD. The package that resulted in D would thus be flagged for further inspection.

The method can be further enhanced by subtracting the expected background curve from the observed pattern. The subtraction of A from C of FIG. 19 will result in a curve E, also shown in FIG. 19. The prominent feature F clearly indicates a variation from the expected background, especially since this difference should be close to zero for all positions. A subtraction of background pattern from the observed pattern for a suspicious situation is included (this subtraction would be near zero with no distinct pattern for non-suspicious situations).

Ratios of observed patterns to background, or other mathematical combinations of these, can also be revealing of illicit materials, with variations from unity being indicative of possible contraband. Software or hardware based pattern recognition and/or comparison methods may be the preferred way of performing comparisons of observed signals with library signals. Mathematical functions can be fit to the library and observed signal versus position curves. Comparison of the resulting parameters can be used to flag suspicious packages once this has been accomplished. An advantage of this is reduced storage requirements for the library.

FIG. 20 illustrates the direct comparison of an observed signal as a function of position, H with a library of curves, here denoted A, B, and C. As an example A can correspond to the presence of one specific radionuclide 1, B can correspond to the presence of a radionuclide 2, and G can correspond to the presence of a high energy therapy machine which is turned on. Because the features of I and J best compare with the features E and F, the presence of radionuclide 1 can be inferred. A subtraction of the expected background can be performed before making these comparisons.

All of the methods discussed above for comparing observed patterns with expected background can also be used for the direct comparison and identification of the presence of radionuclides or other radiation sources with a library containing an expected selection of these. A combination of comparisons of the observed pattern with the expected background and the patterns determined in advance can also be used as a detection method. In such a case, the observed pattern can first be compared with the expected background. If significant deviation is observed, then a comparison with the library of different responses expected for different types of radionuclides can then be made in order to identify the radiation source.

Finally, the type of radiation source can be identified by using branching algorithms similar to those in use for separating deep and shallow doses for traditional dosimetry approaches. This process is illustrated for a hypothetical case in FIG. 21. Empirical relationships between the various signals as a function of positions, 'S(x)' above, would be established.

The process would begin by the comparison of one or more relationships between points or integrated portions of 'S(x)', or alternatively individual detectors in the detector module to an empirically determined constant. These comparisons can be deliberately chosen to optimally separate the different radionuclides of concern. Depending upon the outcome of this comparison, a different set of comparisons would follow. This can be repeated until the types of radiation present and their energies are determined. This information can be compared with a library of information about radionuclides and their emissions.

Alternatively, the final output of the algorithm can be that specific radionuclides are identified, or the source is identified as being a continuous photon source. In this latter approach it would be possible to determine its maximum energy or average energy, depending upon the particular empirical equation implemented.

Special Considerations for Neutrons

Neutrons are found in the presence of special nuclear materials, including uranium and plutonium. Other neutron sources include the radionuclide Cf-252, and combinations of alpha emitting radionuclides with isotopes exhibiting a high probability for absorbing an alpha and emitting a neutron. An example of a source of this latter type is a mixture of polonium with beryllium. The background of neutrons is quite low, and the presence of neutrons in excess of background in cargo for which no neutron sources have been declared would be highly suspicious. Several approaches are possible for the detection of neutrons. These may be applied in the context of the present teachings.

To detect neutrons, materials with a high capability for absorbing neutrons can be mixed, placed in proximity to, or used as the OSL or TL materials in the radiation detector. For example, Lithium-6 has a very strong probability of absorbing neutrons, while lithium-7 does not. Preparing lithium-6 enriched lithium fluoride and doping this with the appropriate dopants to create the desired TL material results in a detector having increased neutron sensitivity. Boron also is strongly absorbing of neutrons, and is one of the elements included in lithium borate, which, if properly doped, has TL properties. Boron is often used as an absorber of thermal neutrons in shields, or as boron fluoride in gaseous neutron detectors. Another strong absorber of thermal neutrons is cadmium. This would make an excellent filter to assist in the detection of the presence of neutrons. Other materials with these properties may be used in conformance with this invention.

Materials with strong neutron absorbing properties may emit secondary radiation at the time they absorb the neutrons, with this secondary radiation forming the basis of a neutron detection system. The neutron's energy is thus converted to a more readily detectable secondary radiation (or radiations resulting from the secondary radiation), thus enhancing the signal from the neutrons.

Alternatively, the neutron absorbing materials preferentially absorb low energy neutrons they can serve as filters, decreasing the contribution of such neutrons to signal in a given detector. One unusual approach would be to have two lithium-6 enriched doped lithium fluoride detectors, with one shielded by cadmium and the other not. There can also be a lithium-7 enriched lithium fluoride detector, which would be rather insensitive to neutrons but detect the presence of other radiation types, to which the lithium-6 enriched would also be sensitive. Comparison of the responses of the three detectors, using empirical or other algorithms, would assist in the identification of the presence and intensity of a neutron flux.

An albedo dosimeter approach can be applied which involves putting different amounts of scattering material on the two sides of the dosimeter. Lower atomic number materials, such as those with high hydrogen content, can be incorporated into the detector to slow down fast or highly energetic neutrons, thus increasing their detection probability when strong thermal neutron absorbers are being used.

Sulfur, sodium, or other elements with high probabilities of neutron absorption reactions of different types also offer possibilities for detecting neutrons. Some of these materials transform themselves into radioactive materials following neutron irradiation, so they will continuously emit radiation. Because this radiation will be continuously emitted, it can thus result in a high signal accumulating in an integrating dosimeter. Combinations of these approaches can also help in discriminating the energy spectra of the neutrons following the same principles applied to the discrimination of alpha, beta, x- and gamma-rays outlined previously.

Dosimeter Placement And Methods of Flagging Suspicious Items

The performance of a system designed to detect illicit radioactive materials can be substantially improved by the deployment of multiple self-reading dosimeters. Several potentially useful approaches to flagging suspicious packages transported by ships or by other means (such as air or ground) will be described here. The more reliable flagging of suspicious cargo can be accomplished by identifying non-uniform distributions of radioactivity within a package, non-uniform distributions within a cargo hold and local deviations from expected background.

Background radiation on a shipping voyage can be expected to be relatively constant, and is measurable. Determination of background radiation levels can be accomplished, among other ways, by placing a dosimeter on a ship's bridge, where it is removed from the cargo, during a given voyage. The overall dose for a given route is also expected to be nearly constant, so data can be accumulated concerning what the signal delivered to a given dosimeter would be due to this background. A correction can be readily accomplished by a simple subtraction procedure. This would also preclude the need for thermal or optical annealing to reset the sensors. Control dosimeters using this approach can also be implemented for air and ground traffic monitoring.

Dosimeters can be placed at multiple strategic locations within ships and in ports to be used as controls. Dosimeters will be compared with dosimeters on other packages having made the same journey and other journeys under similar conditions, or compared as a function of time at the same location. Some forensic information can be garnered from this information as well as from historical information about the dosimeters associated with individual packages.

Instead of using another dosimeter as a control, any other radiation detection system can be employed. As an additional measure, a high sensitivity detector, such as a sodium iodide detector or plastic scintillator-based system can be placed at the entrance to the transportation vehicle's cargo bay. This can be used to intercept packages having higher radioactivity in them before they are transported, but would have decreased sensitivity when compared to the overall dosimeter-based radiation detection systems discussed as part of the present teachings since these can integrate signal either over the entire transportation time or over any shorter interval desired.

The dosimeters described in these inventions can be combined with one or more cheap, real-time alarming dosimeters. These can send out a notice of high dose rates, prompting the container to undergo greater scrutiny, including reading out of the more sensitive integrating dosimeter. The integrating dosimeters themselves can be made self-reading, reading out at periodic intervals chosen to optimize detection efficiency. The dosimeter would thus have real-time capabilities, with data transmitted using available or future communications technologies. Monitors for environmental conditions, such as systems capable of recording real-time or average temperature, light exposure, and humidity can also be placed with the control dosimeters, or within the cargo compartment itself. Data from these can be transmitted to a monitoring center, or read out and recorded at the time the dosimeters are processed.

If dosimeters are placed in multiple locations on a given container, or on all containers to be analyzed together, then increased values of one or more of the dosimeters can be used to flag suspicious cargo. These relative increases can be for dosimeters located on one package, or one package and its immediate neighbors. Alternatively, non-uniform doses measured with multiple dosimeters on a single package would indicate a distribution of radioactive source within the package that can be considered suspicious. This could, for example, identify a concentrated source concealed in a large quantity of a known benign source such as a shipment of ceramic materials.

Along a similar line, spatial dose information can be obtained through the geometric design or the dosimeter form of the radiation detection system itself. For example, the dosimeter can be in the form of paint. A handheld reader can be moved over the paint with positional readings across the surface of the container recorded. Unusual physical distributions of dose can flag cargo as being suspicious because this can indicate the presence of a radioactive point source or another non-uniform radiation distribution within the package. Naturally occurring radioactivity in bulk objects would likely have a uniform distribution in the package. One advantage of the paint form of dosimeter is that it can be made virtually invisible as a screening mechanism, i.e. it would be difficult to recognize as a radiation detection system.

Alpha-emitting radionuclides can be added to portions of the paint to help with tamper-proofing and calibration for environmental conditions, as discussed in the section of this patent concerned with radionuclide identification. Some type of protective sleeve, varnish, or coating can be applied over the paint in order to physically protect it, as well as insulate it from light or heat exposure. Such protection would either have to not interfere with detection of the emitted signal upon readout, or be removable or retractable in some way at the time of readout.

As an alternative to paint, thin strips of material can be attached to the container in such a way as to reveal information about the distribution of dose across the object. This can be read out by running a hand-held reader across it, or feeding it through a strip reader. Positional information of potential value in flagging suspicious radiation distributions within a package can thus be obtained, without necessitating a complex radiation emission tomographic measurement system.

An additional approach to obtaining spatial distributions of dose in a container would utilize a thick bar of detector, or long fiber optic cord, of detection material. The cord can be painted so that ambient light would not enter it. The cord is then read out by opening a cap at the end and using the reader at that location. A specialized reader would be needed to stimulate the material as well as detect the resulting signal. As with other designs, this reader can be hand-held or made integral to the detection system itself. By using long cords, and reading out along the cords, a map of the radiation dose along the container can be made, which might reveal information about irregular irradiation which can be used to flag suspicious packages. The dose as a function of position can reveal information helpful in identifying the presence of sources.

The information obtained from a single dosimeter can be made more useful in flagging suspicious cargo through a comparison, by computer or other methods, to:

a) other dosimeters on the same package during the recent shipment,
b) dosimeters on the same package during prior shipments,
c) dosimeters on other packages shipped with the package of interest during the given shipment (including information about their location on the ship),
d) dosimeters packages being shipped through the same route at other
times,
e) dosimeters on other packages with presumably the same contents,
f) dosimeters placed on the ship and in the shipyard at time of interest,
g) historical values of dosimeters in ship, shipyard, and shipping route at time of interest,
h) average of all dosimeters having passed through a given shipping route, and
i) overall average of all shipped dosimeters, etc. Statistics and other algorithms may be used to flag suspicious packages. Radiation spectral information (see herein) is used and compared in order to flag unusual situations. Unusual variations in space (e.g. container to container, or across a given container) can also be used as flags.

In addition, a library as to what is expected within a given ships' hold can be developed. The output from a given shipping container can be compared to what is expected (from the shipping manifest) will cause a particular cargo container or shipment to be flagged. This library can also contain information about expected radiation type and energy for naturally occurring radioactive materials and background radiation, for use in implementation of the radiation energy and radionuclide identification methods discussed elsewhere. A library of what is expected for a given shipment contents can be developed. If the reading differs substantially from what was declared on the shipping manifest, then the container can be flagged.

Because nuclear radiation background at sea level is nearly a constant, this is well known. These levels can be characterized for specific shipping routes and held as part of the centrally located (or locally encoded) data library used to flag suspicious packages. Variations from the expected background radiation levels and spectra would cause a container to be flagged. A control dosimeter will be placed on the ship. Deviations from these will cause the container to be flagged. Neural networks, artificial intelligence, pattern recognition, and other methods can be used as analysis methods for the comparisons.

Alternative Approaches to the Detection Element

Implementation of the methods described herein may be enhanced using a variety of novel designs that combine different types of detectors with the integrating dosimeters. A sensitive scintillator material can be used which emits light at a wavelength that the OSL dosimeter can store as a signal. The OSL material would then be read out at a future time to determine the dose scenario.

Alternatively, the OSL material can be pre-dosed with a known amount of radiation. The added scintillator material can be chosen such that it emits light at a wavelength that will tend to remove or anneal the stored signal within the OSL material. When the OSLD is then read out, the decrease in the signal over what it should be, based upon the pre-dosing, will be indicative of the dose to which the OSLD was exposed over the time of deployment. With such usage, it would be necessary to correct the signal for the amount of signal arising from the direct dose deposited as stored on the OSLD from the radiation during deployment. Alternatively, the pre-dose can be made very large relative to the doses during deployment, and/or the enhancing scintillator so sensitive that the clearance of material by the enhancing scintillator would dominate over the signal that would arise from the direct exposure of the OSLD to the radiation during deployment.

A scintillator can be affixed to a light-sensitive film, which will continuously integrate the light emitted from the scintillator when the scintillator is exposed to ionizing radiation. The film can then be read out quickly, much in the same way that strips of TL or OSL material would be processed. Films inherently have a fair amount of environmental sensitivity, so choosing films with different fading properties would enable the implementation of the temporal and equilibrating methods taught here. Radiochromic films can also be used.

A bubble detector based upon the usage of a superheated liquid of high viscosity or gel that forms droplets when exposed to neutrons would form a good complementary detector to be used in conjunction with the integrating dosimeters here (see U.S. Pat. No. 4,143,274, which is incorporated herein by reference). This combination is ideal because the bubble detectors are also integrating, and require a light source, already needed in systems designed to read out OSLDs, for their readout.

Track etch detectors are in widespread use for the detection of radon gas through the detection of alpha particles. The incident radiation produces defects in the plastic. These defects are enlarged when etched, and may then be counted, yielding information about the number of particles interacting with the detectors, and thus the dose and/or ambient radiation field. These integrative detectors can similarly be combined with the stimulated luminescent dosimeters discussed here.

Reader Design

Practical usage of dosimeters in a widely distributed network will require either an inexpensive, portable dosimeter reader suitable for rapidly reading sensor materials in-situ or each such radiation detection/sensor system must be made self-reading. The basic design and operational characteristics of a reader system meeting these criteria for multiple dosimeters is described here. Self-reading individual systems can be of similar design, but any electronics or other components added to the dosimeters would need to be even less expensive, more compact, and more durable than a portable, hand-held reader since each detector would need its own independent capability. Because self-reading systems would primarily operate unattended they would need to be enabled to communicate data to the outside world, perhaps through satellite communications.

In some embodiments, the dosimeters can consist of thin strips of TL or OSL material. Such strips can comprise a layer of glass or a polymer doped with the OSL and/or TL material, such layer being in the form of a paint or tape. Alternatively the strip can comprise a thin film layer deposited by a physical deposition method such as sputtering, vacuum evaporation, or the like. As an example of one application, for monitoring of intermodal shipping containers, the 'strips' can be attached to the surface(s) of the container in a reader-accessible position. A purely schematic drawing of a suitable reader concept is shown in FIG. 22.

The reader can be designed in such a manner that it may read the strips while they are still attached to the container. The reader can have an opening in it and it can be placed in direct contact (with a light seal) on the dosimeter. The dosimetric material can consist of paint with dosimetric properties applied to the side of the container, and the handheld reader similarly opened and placed in direct contact with the material for the readout process. While this reader concept will allow in-situ operation, the strips can also be designed for removal from their packaging on the containers. For removable detection strips, the strip or dosimeter can be slipped through a modified reader/detector using a roller system. The reader can also have means to deposit a strip of new material to automatically replace material within the dosimeter holder with a new amount of material. Following or prior to on-site reading, the older material can be deposited into a cassette and assigned a specific number identifying it. The detector material that had been read out can thus be saved for archival purposes.

As will be readily understood, the reader can incorporate a simple system to remove a dosimeter strip from a light-tight holder, read it out, then replace it into the container. This approach is well known for conventional 35 mm film cassettes. This approach can be used in instances for which complete bleaching of the signal from the dosimeters and thus resetting them would not be possible. In such circumstances, a permanent re-readable record of the measurements for the longer-lived signal components will be created. If incomplete bleaching occurs for the dosimeter's materials but they are to be reused, then it would be possible to correct for the signal that continuously accumulates on the dosimeters as a result of continuing deployment. In such an approach, a record is kept of the signal on the detector at each time of readout. This signal is subtracted from the signal during the next readout process.

A handheld reader can also be designed such that it reads bar codes (or other identifying marks) on shipping papers, shipping containers, or the dosimeters themselves. The reader can also have global positioning system information capability that would record such information and the time of the readout.

Referring to FIG. 22, as the stimulating source the reader can utilize one or more of high intensity light sources including, by example, diodes, diode rings, diode arrays, hemispheres of diodes, laser diodes, solid state lasers, compact helium neon (HeNe) lasers, infrared (IR) diode lasers, flash bulbs, regular light bulbs, incandescent focused light sources, light emitting diodes (LEDs), 5 watt LUXEON high intensity LES, sunlight on a bright day or other light sources for the OSL materials to stimulate emission of the signal. Heating elements or intense flash lamps can be used to obtain signal from TL materials. A miniature laser can be used if chosen to be intense enough and if adequate power is available. The light or heat stimulating sources would be chosen such that the overall reader remains sufficiently compact. For example, rings of high intensity diodes of different colors would likely be an excellent choice.

In addition to the several different sensors and selective filters as indicated in FIG. 22, the stimulating light sources can be of alternating, staggered, or different colors that are then alternatively switched on and off. Though not shown in the FIG. 22 there can be a filter in front of each of several light sources to change or narrow their emitted wavelengths even further. A single filter can be physically rotated, or moved in another fashion (linear or angular motion). Filters may be used over a broad spectrum light source(s) to vary the stimulation light frequency. These may be individual over each light source, or a single one covering many, or several different filters used with a single light source. The filter can rotate or otherwise be moved. Different colors of photodiodes (or other light sources, as outlined above) can either be used simultaneously or be able to be switched in sequence.

For signal (visible light) detection, charge coupled devices (CCDs) (compact photomultiplier tubes, or other light detection devices like cooled CCDs, CMOS, etc.) can be used. If photomultipliers are to be utilized, they will need to be especially compact and their power requirements (primarily high voltage) satisfied.

The light collector can be out of the direct line of the stimulating light, but coupled to the detector material by a mirror. The mirror can selectively reflect, such as by use of multi-layer optical interference filter films, only the wavelengths needed for stimulation. Alternatively, a monochrometer can be used for either production of the excitation light at a desired energy or selective detection of different wavelengths of the emitted light. A parabolic reflecting or focusing mirror may be used to focus the excitation light upon the detector or detectors, or the emitted light upon the light detection system. A mirror system can be used to direct signal at an angle so that the light detector is not aligned with the light or heat stimulation source.

As shown in rough schematic fashion in FIG. 22, filters may be employed to selectively direct different wavelengths of emitted light to different portions of a photodiode array or other light sensor (e.g. a strip emitting different colors at different positions). A filter wheel or filter strip can be moved across the signal light detector so that at any given moment the detection of one wavelength of light is favored.

The signal detection electronics itself can allow only signal having a wavelength greater than or less than some chosen value. Electronics would be used to pulse the light beams on and off, with appropriate collection of the light in between pulses. This approach, used in other experimental circumstances is generally referred to as Phase Sensitive Detection. The stimulation is provided periodically at a known frequency and the detector electronics is gated to detect signal only at the same frequency, ignoring all signals not in synchrony with the stimulation source. This approach is useful in order to decrease the effect of noise (electronic noise or 'dark current' in the photodetectors) in the detected signal.

Light baffles, black absorptive paint, and surface roughness can be appropriately used in the reader design to decrease light scatter. Alternatively, use of surfaces designed to be specifically very reflective of the emitted light (multi-player interference mirror surfaces for example) can be used to increase light capture. Alternatively, the inside of the detector chamber can be designed to selectively absorb the stimulation light while reflecting the signal light. All exterior openings would be sealed against extraneous light sources using non-reflecting gaskets (or by other means). Emitted or stimulated light may be focused with lenses, mirrors, or both. The inside surfaces of the reader can be made optimized for different stimulation or emission wavelengths. There can be mechanical or electrochemical mechanisms inside the chamber to change this when different wavelengths are of interest. An integrating sphere can be used with the sample placed inside.

By example, but not excluding other means, electro-cooling or passive cooling fins (a heat sink) may be needed for the light detector as well as for the reader itself. These may be superior to a fan, which would require more power. A vortex tube may have some merit for the cooling of the light detection apparatus in the design.

As will be understood, the reader can be linked by wireless connection to a computer system to allow immediate comparison of readings from one container with averages for other containers on the particular voyage, prior average doses for a given shipping route, the history for the particular container, etc. The reader can alternatively dump information into a computer system at a "checkpoint" or when returned to the lab.

The reader system disclosed here can also be used for retrospective dosimetry, i.e. measurements of naturally occurring TL or OSL phenomenon following events involving large amounts of exposure, or to determine the passage of radioactive materials by a given location. In such instances, the reader can be placed directly next to a rock, boulder, or road salt (a luminescent material). The reader can alternatively be designed to accept small geological samples that can be placed in a chamber, thus enabling geological dating to be done in the field.

What is claimed is:

1. An apparatus for determining a radiation source outputting radiation, said apparatus comprising:
   a detector system having at least one positionally-sensitive detector, said detector system being made of optically stimulated luminescent (OSL) material or thermoluminescent (TL) material, said detector system outputting a detection signal in response to the radiation impacting said detector system;
   at least one filter operably coupled with said detector system, said at least one filter permitting a predetermined spectra of the radiation to impact said detector system; and
   an analysis system receiving and analyzing said detection signal to determine a number of radiation quantum of a predetermined type at a predetermined energy range to determine the radiation source,
   wherein said at least one filter comprises a plurality of filters made of a different filter material.

2. An apparatus for determining a radiation source outputting radiation, said apparatus comprising:
   a detector system having at least one positionally-sensitive detector, said detector system being made of optically stimulated luminescent (OSL) material or thermoluminescent (TL) material, said detector system outputting a detection signal in response to the radiation impacting said detector system;
   at least one filter operably coupled with said detector system, said at least one filter permitting a predetermined spectra of the radiation to impact said detector system; and
   an analysis system receiving and analyzing said detection signal to determine a number of radiation quantum of a predetermined type at a predetermined energy range to determine the radiation source,
   wherein said at least one filter comprises a plurality of filters each defining a different geometry.

3. An apparatus for determining a radiation source outputting radiation, said apparatus comprising:
   a detector system having at least one positionally-sensitive detector, said detector system being made of optically stimulated luminescent (OSL) material or thermoluminescent (TL) material, said detector system outputting a detection signal in response to the radiation impacting said detector system;
   at least one filter operably coupled with said detector system, said at least one filter permitting a predetermined spectra of the radiation to impact said detector system; and
   an analysis system receiving and analyzing said detection signal to determine a number of radiation quantum of a predetermined type at a predetermined energy range to determine the radiation source,
   wherein said at least one filter comprises a wedge-shaped geometry.

4. An apparatus for determining a radiation source outputting radiation, said apparatus comprising:
   a detector system having at least one positionally-sensitive detector, said detector system being made of optically stimulated luminescent (OSL) material or thermoluminescent (TL) material, said detector system outputting a detection signal in response to the radiation impacting said detector system;
   at least one filter operably coupled with said detector system, said at least one filter permitting a predetermined spectra of the radiation to impact said detector system; and
   an analysis system receiving and analyzing said detection signal to determine a number of radiation quantum of a predetermined type at a predetermined energy range to determine the radiation source,
   wherein said detector system comprises a plurality of positionally-sensitive detectors each being of different thickness or type.

5. An apparatus for determining a radiation source outputting radiation, said apparatus comprising:
   a detector system having at least one positionally-sensitive detector, said detector system being made of optically stimulated luminescent (OSL) material or thermoluminescent (TL) material, said detector system outputting a detection signal in response to the radiation impacting said detector system;
   at least one filter operably coupled with said detector system, said at least one filter permitting a predetermined spectra of the radiation to impact said detector system;
   an analysis system receiving and analyzing said detection signal to determine a number of radiation quantum of a predetermined type at a predetermined energy range to determine the radiation source; and
   a shield operably coupled to said detector system, said shield shielding said detector system from radiation from a predetermined direction.

6. An apparatus for determining a radiation source outputting radiation, said apparatus comprising:
   a detector system having at least one positionally-sensitive detector, said detector system being made of optically stimulated luminescent (OSL) material or thermoluminescent (TL) material, said detector system outputting a detection signal in response to the radiation impacting said detector system;

at least one filter operably coupled with said detector system, said at least one filter permitting a predetermined spectra of the radiation to impact said detector system; and an analysis system receiving and analyzing said detection signal to determine a number of radiation quantum of a predetermined type at a predetermined energy range to determine the radiation source, wherein said analysis system using the presence of peaks in a photon attenuation coefficients as a function of energy to assist in said determining the radiation source.

7. An apparatus for determining a radiation source outputting radiation, said apparatus comprising:

a detector system having at least one positionally-sensitive detector, said detector system being made of optically stimulated luminescent (OSL) material or thermoluminescent (TL) material, said detector system outputting a detection signal in response to the radiation impacting said detector system;

at least one filter operably coupled with said detector system, said at least one filter permitting a predetermined spectra of the radiation to impact said detector system; and an analysis system receiving and analyzing said detection signal to determine a number of radiation quantum of a predetermined type at a predetermined energy range to determine the radiation source, wherein said analysis system receives and analyzes said detection signal as a function of position within said detector system.

8. An apparatus for determining a radiation source outputting radiation, said apparatus comprising:

a detector system having at least one positionally-sensitive detector, said detector system being made of optically stimulated luminescent (OSL) material or thermoluminescent (TL) material, said detector system outputting a detection signal in response to the radiation impacting said detector system;

at least one filter operably coupled with said detector system, said at least one filter permitting a predetermined spectra of the radiation to impact said detector system; and an analysis system receiving and analyzing said detection signal to determine a number of radiation quantum of a predetermined type at a predetermined energy range to determine the radiation source, wherein said analysis system subtracts background noise from said detection signal.

9. An apparatus for determining a radiation source outputting radiation, said apparatus comprising:

a detector system having at least one positionally-sensitive detector, said detector system being made of optically stimulated luminescent (OSL) material or thermoluminescent (TL) material, said detector system outputting a detection signal in response to the radiation impacting said detector system;

at least one filter operably coupled with said detector system, said at least one filter permitting a predetermined spectra of the radiation to impact said detector system; and an analysis system receiving and analyzing said detection signal to determine a number of radiation quantum of a predetermined type at a predetermined energy range to determine the radiation source, wherein said analysis system receives and analyzes said detection signal, said analysis system using a branching decision algorithm to determine at least one of a type and energy of the radiation.

10. An apparatus for determining a radiation source outputting radiation, said apparatus comprising:

a detector system having at least one positionally-sensitive detector, said detector system being made of optically stimulated luminescent (OSL) material or thermoluminescent (TL) material, said detector system outputting a detection signal in response to the radiation impacting said detector system;

at least one filter operably coupled with said detector system, said at least one filter permitting a predetermined spectra of the radiation to impact said detector system; and an analysis system receiving and analyzing said detection signal to determine a number of radiation quantum of a predetermined type at a predetermined energy range to determine the radiation source, wherein said analysis system receives and analyzes said detection signal, said analysis system comparing said detection signal to a library of known detection signals to determine at least one of a type and energy of the radiation.

11. An apparatus for determining a radiation source outputting radiation, said apparatus comprising:

a detector system having at least one positionally-sensitive detector, said detector system being made of optically stimulated luminescent (OSL) material or thermoluminescent (TL) material, said detector system outputting a detection signal in response to the radiation impacting said detector system;

at least one filter operably coupled with said detector system, said at least one filter permitting a predetermined spectra of the radiation to impact said detector system; and an analysis system receiving and analyzing said detection signal to determine a number of radiation quantum of a predetermined type at a predetermined energy range to determine the radiation source, wherein said analysis system receives and analyzes said detection signal, said analysis system using non-linear optimization methods to determine at least one of a type and energy of the radiation.

12. An apparatus for determining a radiation source outputting radiation, said apparatus comprising:

a detector system having at least one positionally-sensitive detector, said detector system being made of optically stimulated luminescent (OSL) material or thermoluminescent (TL) material, said detector system outputting a detection signal in response to the radiation impacting said detector system;

at least one filter operably coupled with said detector system, said at least one filter permitting a predetermined spectra of the radiation to impact said detector system; and an analysis system receiving and analyzing said detection signal to determine a number of radiation quantum of a predetermined type at a predetermined energy range to determine the radiation source, wherein said analysis system receives and analyzes said detection signal, said analysis system using a neural network to determine at least one of a type and energy of the radiation.

13. An apparatus for determining a radiation source outputting radiation, said apparatus comprising:
- a detector system having at least one positionally-sensitive detector, said detector system being made of optically stimulated luminescent (OSL) material or thermoluminescent (TL) material, said detector system outputting a detection signal in response to the radiation impacting said detector system;
- at least one filter operably coupled with said detector system, said at least one filter permitting a predetermined spectra of the radiation to impact said detector system; and
- an analysis system receiving and analyzing said detection signal to determine a number of radiation quantum of a predetermined type at a predetermined energy range to determine the radiation source,
- wherein said analysis system receives and analyzes said detection signal, said analysis system using non-linear least squares methods to determine at least one of a type and energy of the radiation.

14. An apparatus for determining a radiation source outputting radiation, said apparatus comprising:
- a detector system having at least one positionally-sensitive detector, said detector system being made of optically stimulated luminescent (OSL) material or thermoluminescent (TL) material, said detector system outputting a detection signal in response to the radiation impacting said detector system;
- at least one filter operably coupled with said detector system, said at least one filter permitting a predetermined spectra of the radiation to impact said detector system; and
- an analysis system receiving and analyzing said detection signal to determine a number of radiation quantum of a predetermined type at a predetermined energy range to determine the radiation source.

15. The apparatus according to claim 14 wherein said analysis system receives and analyzes said detection signal, said analysis system using a curve stripping method with positivity constraint to determine at least one of a type and energy of the radiation.

* * * * *

UNITED STATES PATENT AND TRADEMARK OFFICE
CERTIFICATE OF CORRECTION

| | |
|---|---|
| PATENT NO. | : 7,855,375 B2 |
| APPLICATION NO. | : 12/341102 |
| DATED | : December 21, 2010 |
| INVENTOR(S) | : Kimberlee Jane Kearfott |

It is certified that error appears in the above-identified patent and that said Letters Patent is hereby corrected as shown below:

Column 3, line 39, "required" should be --require--.

Column 3, line 59, "view" should be --views--.

Column 7, line 10, "and" should be --an--.

Column 7, line 11, "(6a)" should be -- (6A)--.

Column 8, line 28, "(6) (7)" should be --(6), (7)--.

Column 11, line 62, "t 23" should be --t=23--.

Column 19, line 61, "11" should be --12--.

Column 20, line 13, after "process", insert --.--.

Column 22, line 28, "(H) ≤ t ≤ 60 (I)" should be --(H) < t < 60 (I)--.

Column 25, lines 3-4, "'$X_{minimum}$' to '$X_{maximum}$'" should be --'$\lambda_{minimum}$' to '$\lambda_{maximum}$'--.

Column 25, line 61, "know" should be --known--.

Column 26, line 7, "Equation (3.4)" should be --Equations (3,4)--.

Column 27, line 43, after "conditions", insert --.--.

Column 27, line 46, "light tight" should be --light, tight--.

Column 29, line 17, after "example", insert --,--.

Column 29, line 36, "receiver" should be --receive--.

Column 32, line 40, "Filter, C" should be --filter C--.

Column 32, line 51, "when" should be --When--.

Column 32, line 53, "h and 'I'" should be --'h' and 'I'--.

Column 32, line 64, delete "be used".

Column 36, line 48, "Lithium-6" should be --lithium-6--.

Column 37, line 2, after "neutrons", insert --;--.

Signed and Sealed this

Twentieth Day of September, 2011

David J. Kappos
*Director of the United States Patent and Trademark Office*